United States Patent
Yu et al.

(10) Patent No.: US 11,003,360 B2
(45) Date of Patent: May 11, 2021

(54) IO REQUEST PROCESSING ACCORDING TO PROCESSING SORTING INDEXES

(71) Applicant: Huawei Technologies Co., Ltd., Shenzhen (CN)

(72) Inventors: Si Yu, Hangzhou (CN); Junhui Gong, Hangzhou (CN); Cong Zhao, Hangzhou (CN); Cheng Wang, Hangzhou (CN); Yue Lu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 42 days.

(21) Appl. No.: 16/457,086

(22) Filed: Jun. 28, 2019

(65) Prior Publication Data

US 2019/0324662 A1    Oct. 24, 2019

Related U.S. Application Data

(63) Continuation of application No. PCT/CN2016/113083, filed on Dec. 29, 2016.

(51) Int. Cl.
    *G06F 3/06* (2006.01)

(52) U.S. Cl.
    CPC .......... *G06F 3/0613* (2013.01); *G06F 3/067* (2013.01); *G06F 3/0611* (2013.01); *G06F 3/0653* (2013.01); *G06F 3/0659* (2013.01); *G06F 3/0673* (2013.01)

(58) Field of Classification Search
    None
    See application file for complete search history.

(56) References Cited

U.S. PATENT DOCUMENTS

| | | | |
|---|---|---|---|
| 7,823,154 B2 | 10/2010 | Wang et al. | |
| 7,917,903 B2 | 3/2011 | Lumb et al. | |
| 8,321,627 B1 * | 11/2012 | Norrie | G06F 13/161 |
| | | | 711/103 |
| 9,170,943 B2 | 10/2015 | Camp et al. | |
| 9,680,931 B1 | 6/2017 | Karnowski et al. | |
| 2005/0289312 A1 | 12/2005 | Ghosal et al. | |
| 2006/0140201 A1 | 6/2006 | Kumar et al. | |

(Continued)

FOREIGN PATENT DOCUMENTS

| | | |
|---|---|---|
| CN | 101272334 A | 9/2008 |
| CN | 101299181 A | 11/2008 |

(Continued)

OTHER PUBLICATIONS

"CFQ." Dec. 2014. https://web.archive.org/web/20141228104139/ http://www.kernel.org/doc/Documentation/block/cfq-iosched.txt. (Year: 2014).*
Foreign Communication From a Counterpart Application, European Application No. 16925559.3, Extended European Search Report dated Nov. 18, 2019, 9 pages.
Machine Translation and Abstract of Chinese Publication No. CN103412790, Nov. 27, 2013, 7 pages.

(Continued)

*Primary Examiner* — Nathan Sadler
(74) *Attorney, Agent, or Firm* — Conley Rose, P.C.

(57) ABSTRACT

A storage controller includes a distribution core, a plurality of sorting cores, and a request processing core. The three types of cores are separately configured to distribute an input/output (IO) request to different sorting cores, generate a processing sorting index for each IO request, and process the IO request according to a value of the processing sorting index of each IO request to flexibly schedule the IO request received by the storage controller.

20 Claims, 18 Drawing Sheets

(56) References Cited

U.S. PATENT DOCUMENTS

| | | | |
|---|---|---|---|
| 2007/0226532 A1 | 9/2007 | Matsuda | |
| 2010/0030931 A1 | 2/2010 | Balasubramanian | |
| 2010/0262730 A1 | 10/2010 | Jibbe et al. | |
| 2013/0067187 A1 | 3/2013 | Moss et al. | |
| 2013/0290656 A1 | 10/2013 | Staelin et al. | |
| 2014/0059553 A1 | 2/2014 | Chandhoke | |
| 2015/0067271 A1 | 3/2015 | Camp et al. | |
| 2015/0254088 A1 | 9/2015 | Chou et al. | |
| 2016/0092108 A1 | 3/2016 | Karaje et al. | |
| 2016/0231948 A1* | 8/2016 | Gupta | G06F 3/067 |
| 2016/0299695 A1 | 10/2016 | Chen et al. | |
| 2016/0299697 A1 | 10/2016 | Chen et al. | |
| 2016/0313943 A1 | 10/2016 | Hashimoto et al. | |
| 2016/0371014 A1* | 12/2016 | Roberts | G06F 3/0659 |
| 2017/0185449 A1 | 6/2017 | Zhang et al. | |
| 2017/0222935 A1* | 8/2017 | Kalman | H04L 41/0893 |
| 2017/0286283 A1 | 10/2017 | Xu et al. | |
| 2018/0095789 A1 | 4/2018 | Zhang | |
| 2019/0303008 A1 | 10/2019 | Bennett | |
| 2019/0332328 A1* | 10/2019 | Yu | G06F 3/0637 |

FOREIGN PATENT DOCUMENTS

| | | |
|---|---|---|
| CN | 102073461 A | 5/2011 |
| CN | 102929787 A | 2/2013 |
| CN | 103299271 A | 9/2013 |
| CN | 103338252 A | 10/2013 |
| CN | 103412790 A | 11/2013 |
| CN | 103577115 A | 2/2014 |
| CN | 104679575 A | 6/2015 |
| CN | 105183375 A | 12/2015 |
| CN | 105589829 A | 5/2016 |
| CN | 105892955 A | 8/2016 |
| CN | 105934793 A | 9/2016 |
| CN | 106155764 A | 11/2016 |
| CN | 106775493 A | 5/2017 |
| EP | 2330506 A1 | 6/2011 |
| JP | 2007257180 A | 10/2007 |
| JP | 2014507025 A | 3/2014 |

OTHER PUBLICATIONS

Foreign Communication From a Counterpart Application, European Application No. 17889889.6, Extended European Search Report dated Oct. 29, 2019, 9 pages.
Machine Translation and Abstract of Chinese Publication No. CN101272334, Sep. 24, 2008, 16 pages.
Machine Translation and Abstract of Chinese Publication No. CN101299181, Nov. 5, 2008, 19 pages.
Machine Translation and Abstract of Chinese Publication No. CN102073461, May 25, 2011, 22 pages.
Machine Translation and Abstract of Chinese Publication No. CN103338252, Oct. 2, 2013, 9 pages.
Machine Translation and Abstract of Chinese Publication No. CN105892955, Aug. 24, 2016, 21 pages.
Machine Translation and Abstract of Chinese Publication No. CN106775493, May 31, 2017, 30 pages.
Foreign Communication From a Counterpart Application, Chinese Application No. 201710008824.7, Chinese Office Action dated Sep. 3, 2018, 5 pages.
Foreign Communication From a Counterpart Application, PCT Application No. PCT/CN2016/113083, English Translation of International Search Report dated Sep. 6, 2017, 2 pages.
Foreign Communication From a Counterpart Application, PCT Application No. PCT/CN2016/113083, English Translation of Written Opinion dated Sep. 6, 2017, 4 pages.
Foreign Communication From a Counterpart Application, PCT Application No. PCT/CN2017/108194, English Translation of International Search Report dated Jan. 31, 2018, 2 pages.
Foreign Communication From a Counterpart Application, PCT Application No. PCT/CN2017/108194, English Translation of Written Opinion dated Jan. 31, 2018, 5 pages.
Machine Translation and Abstract of Chinese Publication No. CN103577115, Feb. 12, 2014, 24 pages.
Machine Translation and Abstract of Chinese Publication No. CN104679575, Jun. 3, 2015, 16 pages.
Machine Translation and Abstract of Chinese Publication No. CN105183375, Dec. 23, 2015, 21 pages.
Foreign Communication From a Counterpart Application, Chinese Application No. 201680091657.0, Chinese Search Report dated Dec. 3, 2019, 3 pages.

* cited by examiner

IO REQUEST PROCESSING ACCORDING TO PROCESSING SORTING INDEXES

CROSS-REFERENCE TO RELATED APPLICATIONS

This application is a continuation of International Patent Application No. PCT/CN2016/113083 filed on Dec. 29, 2016, the disclosure of which is hereby incorporated by reference in its entirety.

TECHNICAL FIELD

This application relates to the field of storage technologies, and in particular, to a storage controller and an input/output (IO) request processing method performed by the storage controller.

BACKGROUND

As shown in FIG. 1, a storage array is usually used in a large-scale storage scenario, and includes a plurality of storage media and a storage controller. The storage medium may include a hard disk drive (HDD) and a solid state drive (SSD). A client sends an IO request to the storage controller using a communications network. The storage controller processes the received IO request. For example, when the IO request is a read request, the storage controller determines a specific storage medium to which the read request points, and then the storage controller reads corresponding data from the storage medium to which the read request points, and returns the data to the client.

The storage controller virtualizes the storage media of the storage array into a plurality of storage units. The IO request received by the storage controller usually points to a storage unit. When different storage types are used, the storage controller virtualizes the plurality of storage media into storage units of different types. For example, when block storage is used, the storage controller virtualizes the plurality of storage media into one or more logical unit numbers (LUN), and each IO request of the client points to a LUN. Each IO request of the client points to a file system when file storage is used. Each IO request of the client points to a bucket when object storage is used.

Because of a service requirement, a user usually needs to set IO per second (IOPS) parameters for different storage units. If a quantity of IO requests sent by the client is relatively large, and the IO requests point to different storage units, because a speed at which the storage controller processes the IO requests is limited, the storage controller needs to schedule the received IO requests, so as to fulfill QOS parameters of the plurality of storage units as far as possible.

An IOPS parameter fulfillment rate in an existing IO request scheduling method is relatively low.

SUMMARY

This application provides a storage controller, so as to increase an IOPS parameter fulfillment rate.

A first aspect of this application provides a storage controller, where the storage controller is applicable to a storage system with a plurality of storage units, the storage controller includes a memory device and a plurality of processor cores, and the plurality of processor cores include at least one distribution core, a plurality of sorting cores, and at least one request processing core.

When working, the distribution core executes code stored in the memory device, so as to receive an IO request stored in the memory device and distribute the received IO request to the plurality of sorting cores.

When working, each sorting core executes code stored in the memory device, to perform the following actions: obtaining an IO request that is distributed by the distribution core and for which a processing sorting index is to be generated; determining a target storage unit to which the IO request for which the processing sorting index is to be generated points; obtaining an accumulative index quantity of the target storage unit, where the accumulative index quantity of the target storage unit indicates a quantity of IO requests that point to the target storage unit and for which the plurality of sorting cores have generated processing sorting indexes since each sorting core generated a processing sorting index for a previously distributed IO request, where the previously distributed IO request points to the target storage unit; generating, according to the processing sorting index of the previously distributed IO request and a ratio of the accumulative index quantity of the target storage unit to an IO per second parameter of the target storage unit, the processing sorting index for the IO request for which the processing sorting index is to be generated; and storing, into an index queue corresponding to each sorting core, the processing sorting index of the IO request for which the processing sorting index is to be generated, where the index queue corresponding to each sorting core is stored in the memory device, and includes processing sorting indexes generated by each sorting core for IO requests that point to the plurality of storage units.

When working, the request processing core executes code stored in the memory device, to periodically process an IO request corresponding to a minimum processing sorting index in the index queue corresponding to each sorting core.

The distribution core, the plurality of sorting cores, and the request processing core may concurrently work.

The plurality of sorting cores generate the processing sorting index for each IO request, and determine a processing sequence according to a value of the processing sorting index of each IO request, so that an IOPS parameter fulfillment rate is effectively increased.

Each sorting core mentioned in any aspect of this application or any implementation of any aspect represents any one of the plurality of sorting cores.

Optionally, the IO request that is mentioned in any aspect of this application or any implementation of any aspect and for which the processing sorting index is to be generated is a next IO request that is distributed to each sorting core after the previously distributed IO request.

With reference to the first aspect, in a first implementation of the first aspect, each sorting core performs the following operation to obtain the accumulative index quantity of the target storage unit: obtaining, from a shared counter for the target storage unit, a current total quantity of IO requests that point to the target storage unit and for which the plurality of sorting cores have generated processing sorting indexes. A shared counter is set for each storage unit in the memory device.

Subsequently, a previous total quantity of IO requests that point to the target storage unit and for which the plurality of sorting cores have generated processing sorting indexes when the plurality of sorting cores generate processing sorting indexes for the previously distributed IO request is obtained from a private counter that is of each sorting core and that corresponds to the target storage unit. A private counter corresponding to each storage unit is set for each sorting core in the memory device.

Subsequently, a difference between the current total quantity of IO requests and the previous total quantity of IO requests is calculated, to use the difference as the accumulative index quantity of the target storage unit. Subsequently, a value of the shared counter for the target storage unit is increased by 1, and then the private counter that is of each sorting core and that corresponds to the target storage unit is updated using the value of the shared counter for the target storage unit.

In the storage controller provided in this aspect, when obtaining the accumulative index quantity of the target storage unit, each sorting core does not need to access another sorting core to obtain a status of generating, by the another sorting core, a processing sorting index for an IO request, so that scheduling efficiency is improved.

With reference to the first aspect, in a second implementation of the first aspect, each sorting core performs the following operation to obtain the accumulative index quantity of the target storage unit: obtaining a plurality of private quantities from first private counters that are of the plurality of sorting cores and that correspond to the target storage unit, where a private quantity of each sorting core indicates a quantity of IO requests that point to the target storage unit and for which each sorting core has generated processing sorting indexes.

Each sorting core mentioned in any aspect of this application or any implementation of any aspect represents any one of the plurality of sorting cores.

Subsequently, the plurality of private quantities are summed to obtain a current global quantity of IO requests that point to the target storage unit and for which processing sorting indexes have been generated.

Subsequently, a previous global quantity of IO requests that point to the target storage unit and for which the plurality of sorting cores have generated processing sorting indexes when the plurality of sorting cores generate processing sorting indexes for the previously distributed IO request is obtained from a second private counter that is of each sorting core and that corresponds to the target storage unit. A first private counter and a second private counter that correspond to each storage unit are set for each sorting core in the memory device.

Subsequently, a difference between the current global quantity of IO requests and the previous global quantity of IO requests is calculated, to use the difference as the accumulative index quantity of the target storage unit.

Subsequently, a value of the first private counter that is of each sorting core and that corresponds to the target storage unit is increased by 1, and the second private counter that is of each sorting core and that corresponds to the target storage unit is updated using a sum of current private quantities of the plurality of sorting cores. Before the second private counter is updated, the value of the first private counter that is of each sorting core and that corresponds to the target storage unit is increased by 1. Therefore, each sorting core increases the current global quantity of IO requests by 1 to obtain the sum of the current private quantities of the plurality of sorting cores. In the storage controller provided in this aspect, when obtaining the accumulative index quantity of the target storage unit, each sorting core does not need to access another sorting core to obtain a status of generating, by the another sorting core, a processing sorting index for an IO request, so that scheduling efficiency is improved.

With reference to the first aspect, the first implementation of the first aspect, or the second implementation of the first aspect, in a third implementation of the first aspect, each sorting core performs the following operations to generate the processing sorting index for the IO request for which the processing sorting index is to be generated: obtaining a current system time; and subsequently, using, as the processing sorting index of the IO request for which the processing sorting index is to be generated, a larger one of the current system time and a sum of the processing sorting index of the previously distributed IO request and the ratio of the accumulative index quantity of the target storage unit to the IO per second parameter of the target storage unit.

That is, the processing sorting index of the IO request for which the processing sorting index is to be generated=Max {processing sorting index of the previously distributed IO request+K×accumulative index quantity of the target storage unit/IO per second parameter of the target storage unit, current system time}.

The system time is considered into the calculation of the processing sorting index, so that IO request scheduling precision is improved.

With reference to the first aspect, the first implementation of the first aspect, the second implementation of the first aspect, or the third implementation of the first aspect, in a fourth implementation of the first aspect, each sorting core is further configured to at a moment after the processing sorting index is generated for the IO request for which the processing sorting index is to be generated, determine that there is no IO request that is distributed to each sorting core, that points to the target storage unit, and for which an index is not generated; in this case, calculate a sum of the processing sorting index of the IO request for which the processing sorting index is to be generated and a ratio of an accumulative index quantity of the target storage unit at the moment to the IO per second parameter of the target storage unit, to use the sum as an awaiting processing sorting index; and store the awaiting processing sorting index into the index queue corresponding to each sorting core.

That is, the awaiting processing sorting index=processing sorting index of the previously distributed IO request+K× accumulative index quantity of the target storage unit at the moment/IO per second parameter of the target storage unit.

The accumulative index quantity of the target storage unit at the moment indicates a quantity of IO requests that point to the target storage unit and for which the plurality of sorting cores have generated processing sorting indexes before the moment and since each sorting core generated a last processing sorting index that points to the target storage unit.

In a running process of each sorting core, once in the IO request that is distributed to each sorting core and for which an index is not generated, there is no IO request that points to the target storage unit, the awaiting processing sorting index is generated.

With reference to the fourth implementation of the first aspect, in a fifth implementation of the first aspect, during a period in which the awaiting processing sorting index exists in the index queue corresponding to each sorting core, an IO request corresponding to a processing sorting index that is included in the index queue corresponding to each sorting core and that is greater than the awaiting processing sorting index cannot be processed by the request processing core; and each sorting core is further configured to when an IO request that points to the target storage unit is distributed to each sorting core after the moment or when a time in which the awaiting processing sorting index exists exceeds a preset threshold, eliminate the awaiting processing sorting index from the index queue corresponding to each sorting core.

Use of the awaiting processing sorting index can improve IO request scheduling precision.

With reference to any one of the first aspect or the implementations of the first aspect, in a sixth implementation of the first aspect, the request processing core performs the following operations to periodically process the IO request corresponding to the minimum processing sorting index in the index queue corresponding to each sorting core periodically accessing the index queue corresponding to each sorting core; and processing, in each access, the IO request corresponding to the minimum processing sorting index in the index queue corresponding to each sorting core.

A second aspect of this application provides an IO request processing method, and the storage controller provided in the first aspect performs the method when running. The method includes receiving, by a distribution core, an IO request, and distributing the received IO request to the plurality of sorting cores; obtaining, by each sorting core, an IO request that is distributed by the distribution core and for which a processing sorting index is to be generated; determining, by each sorting core, a target storage unit to which the IO request for which the processing sorting index is to be generated points; obtaining, by each sorting core, an accumulative index quantity of the target storage unit, where the accumulative index quantity of the target storage unit indicates a quantity of IO requests that point to the target storage unit and for which the plurality of sorting cores have generated processing sorting indexes since each sorting core generated a processing sorting index for a previously distributed IO request, where the previously distributed IO request points to the target storage unit; generating, by each sorting core according to the processing sorting index of the previously distributed IO request and a ratio of the accumulative index quantity of the target storage unit to an IO per second parameter of the target storage unit, the processing sorting index for the IO request for which the processing sorting index is to be generated; storing, by each sorting core into an index queue corresponding to each sorting core, the processing sorting index of the IO request for which the processing sorting index is to be generated, where the index queue corresponding to each sorting core is stored in the memory device, and includes processing sorting indexes generated by each sorting core for IO requests that point to the plurality of storage units; and periodically processing, by a request processing core, an IO request corresponding to a minimum processing sorting index in the index queue corresponding to each sorting core.

With reference to the second aspect, in a first implementation of the second aspect, the obtaining, by each sorting core, an accumulative index quantity of the target storage unit includes obtaining, by each sorting core from a shared counter for the target storage unit, a current total quantity of IO requests that point to the target storage unit and for which the plurality of sorting cores have generated processing sorting indexes; obtaining, by each sorting core from a private counter that is of each sorting core and that corresponds to the target storage unit, a previous total quantity of IO requests that point to the target storage unit and for which the plurality of sorting cores have generated processing sorting indexes when the plurality of sorting cores generate processing sorting indexes for the previously distributed IO request; calculating, by each sorting core, a difference between the current total quantity of IO requests and the previous total quantity of IO requests, to use the difference as the accumulative index quantity of the target storage unit; increasing, by each sorting core, a value of the shared counter for the target storage unit by 1; and updating, by each sorting core using the value of the shared counter for the target storage unit, the private counter that is of each sorting core and that corresponds to the target storage unit.

With reference to the second aspect, in a second implementation of the second aspect, the obtaining, by each sorting core, an accumulative index quantity of the target storage unit includes obtaining, by each sorting core, a plurality of private quantities from first private counters that are of the plurality of sorting cores and that correspond to the target storage unit, where a private quantity of each sorting core indicates a quantity of IO requests that point to the target storage unit and for which each sorting core has generated processing sorting indexes; summing, by each sorting core, the plurality of private quantities to obtain a current global quantity of IO requests that point to the target storage unit and for which processing sorting indexes have been generated; obtaining, by each sorting core from a second private counter that is of each sorting core and that corresponds to the target storage unit, a previous global quantity of IO requests that point to the target storage unit and for which the plurality of sorting cores have generated processing sorting indexes when the plurality of sorting cores generate processing sorting indexes for the previously distributed IO request; calculating, by each sorting core, a difference between the current global quantity of IO requests and the previous global quantity of IO requests, to use the difference as the accumulative index quantity of the target storage unit; increasing, by each sorting core by 1, a value of the first private counter that is of each sorting core and that corresponds to the target storage unit; and updating, by each sorting core using a sum of current private quantities of the plurality of sorting cores, the second private counter that is of each sorting core and that corresponds to the target storage unit.

With reference to the second aspect, the first implementation of the second aspect, or the second implementation of the second aspect, in a third implementation of the second aspect, the generating, by each sorting core, the processing sorting index for the IO request for which the processing sorting index is to be generated includes obtaining, by each sorting core, a current system time; and using, by each sorting core as the processing sorting index of the IO request for which the processing sorting index is to be generated, a larger one of the current system time and a sum of the processing sorting index of the previously distributed IO request and the ratio of the accumulative index quantity of the target storage unit to the IO per second parameter of the target storage unit.

With reference to the second aspect, the first implementation of the second aspect, the second implementation of the second aspect, or the third implementation of the second aspect, in a fourth implementation of the second aspect, the method further includes at a moment after the processing sorting index is generated for the IO request for which the processing sorting index is to be generated, determining, by each sorting core, that there is no IO request that is distributed to each sorting core, that points to the target storage unit, and for which an index is not generated; obtaining, by each sorting core, an accumulative index quantity of the target storage unit at the moment, where the accumulative index quantity of the target storage unit at the moment indicates a quantity of IO requests that point to the target storage unit and for which the plurality of sorting cores have generated processing sorting indexes before the moment and since each sorting core generated a last processing sorting index that points to the target storage unit; subsequently calculating, by each sorting core, a sum of the processing sorting index of the IO request for which the processing sorting index is to be generated and a ratio of the accumulative index quantity of the target storage unit at the moment to the IO per second parameter of the target storage unit, to use the sum as an awaiting processing sorting index; and subsequently storing, by each sorting core, the awaiting processing sorting index into the index queue corresponding to each sorting core.

With reference to the fourth implementation of the second aspect, in a fifth implementation of the second aspect, during a period in which the awaiting processing sorting index exists in the index queue corresponding to each sorting core, an IO request corresponding to a processing sorting index that is included in the index queue corresponding to each sorting core and that is greater than the awaiting processing sorting index cannot be processed by the request processing core; and the method further includes when an IO request that points to the target storage unit is distributed to each sorting core after the moment or when a time in which the awaiting processing sorting index exists exceeds a preset threshold, eliminating, by each sorting core, the awaiting processing sorting index from the index queue corresponding to each sorting core.

With reference to any one of the second aspect or the implementations of the second aspect, in a sixth implementation of the second aspect, the periodically processing, by the request processing core, an IO request corresponding to a minimum processing sorting index in the index queue corresponding to each sorting core includes periodically accessing, by the request processing core, the index queue corresponding to each sorting core; and processing, by the request processing core in each access, the IO request corresponding to the minimum processing sorting index in the index queue corresponding to each sorting core.

A third aspect of this application provides a storage medium, where the storage medium stores a program, and when the program runs on a computing device, the computing device performs the IO request processing method provided in any one of the second aspect or the implementations of the second aspect. The storage medium includes but is not limited to a read-only memory, a random access memory, a flash memory, an HDD, or an SSD.

A fourth aspect of this application provides a computer program product, where the computer program product includes a program instruction, and when the computer program product is executed by a storage controller, the storage controller performs the IO request processing method provided in any one of the second aspect or the implementations of the second aspect. The computer program product may be a software installation package, and when the IO request processing method provided in any one of the second aspect or the implementations of the second aspect needs to be used, the computer program product may be downloaded, and the computer program product may be executed on a storage controller.

DESCRIPTION OF EMBODIMENTS

The following describes the technical solutions in the embodiments of this application with reference to the accompanying drawings in the embodiments of this application.

In this application, there is no logical or time-sequential dependency among the "first", the "second", and the "$n^{th}$".

In this specification, a processor includes one or more central processing units (CPU), and each central processing unit includes one or more cores.

In this specification, a storage unit may be a LUN, a file system, or a bucket. The LUN, the file system, or the bucket respectively corresponds to a case in which a storage array uses block storage, file storage, or object storage. For example, the storage array in this specification presents P LUNs to a client, where P is a positive integer greater than 1.

In this specification, an IO request includes IO data and metadata. The IO data includes information such as to-be-operated data of the IO request and an address of the to-be-operated data. The metadata includes a storage unit ID to which the IO request points. The storage unit ID may be a LUN ID, a file system ID, or a bucket ID.

In this specification, a function of a function Max {x, y} is to return a larger value in x and y.

In this specification, an IOPS parameter may be IOPS of a storage unit, or an IOPS processing weight of a storage unit. The IOPS processing weight represents a proportion of a resource used by a storage array to process an IO request that points to each storage unit. Therefore, the IOPS parameter may be set by a user according to a service requirement. For example, the user determines, according to a service requirement, lowest IOPS of a storage unit related to a service, or the user determines a weight of a resource that is of the storage array and that needs to be occupied by IOPS of a storage unit related to a service. Alternatively, the IOPS parameter may be set according to a user class. For example, an IOPS parameter of an advanced user is relatively high, to ensure experience of the advanced user. A storage controller stores IOPS parameters of different storage units.

Figure 1:
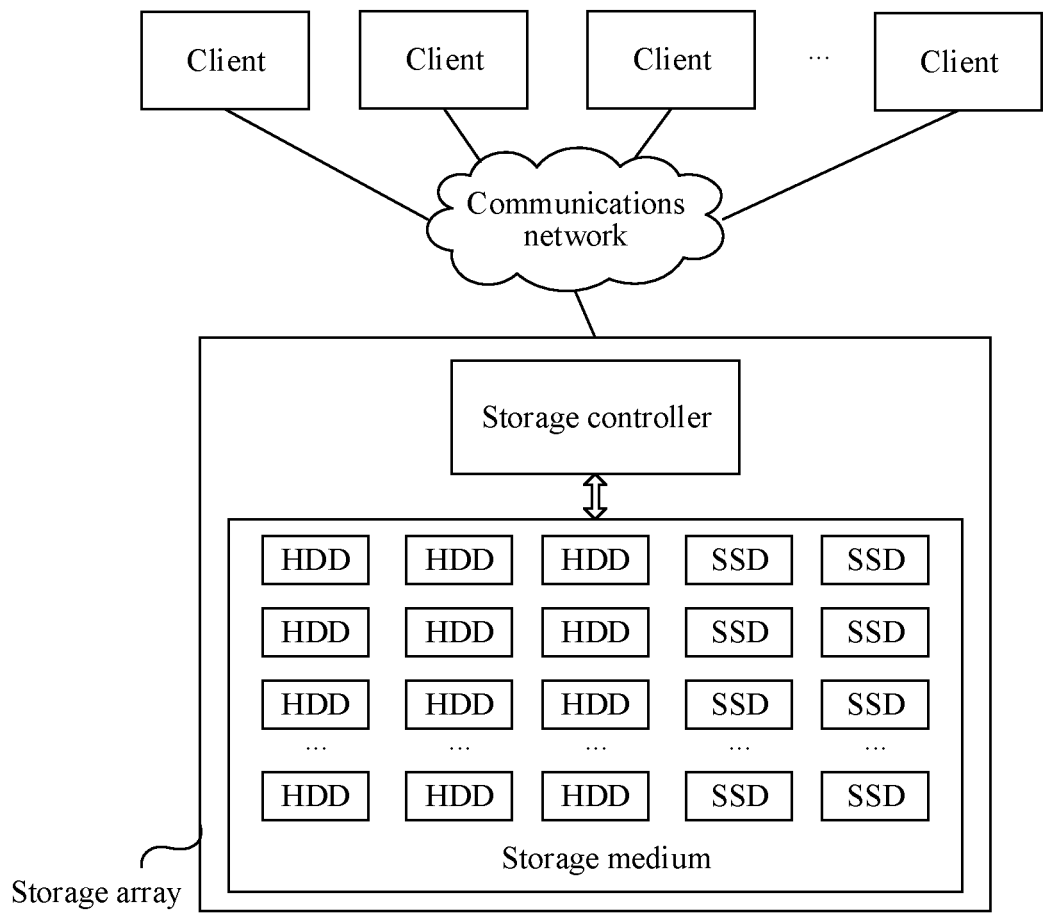
FIG. 1 is a schematic diagram of an organizational structure of a storage system.
Figure 2A:
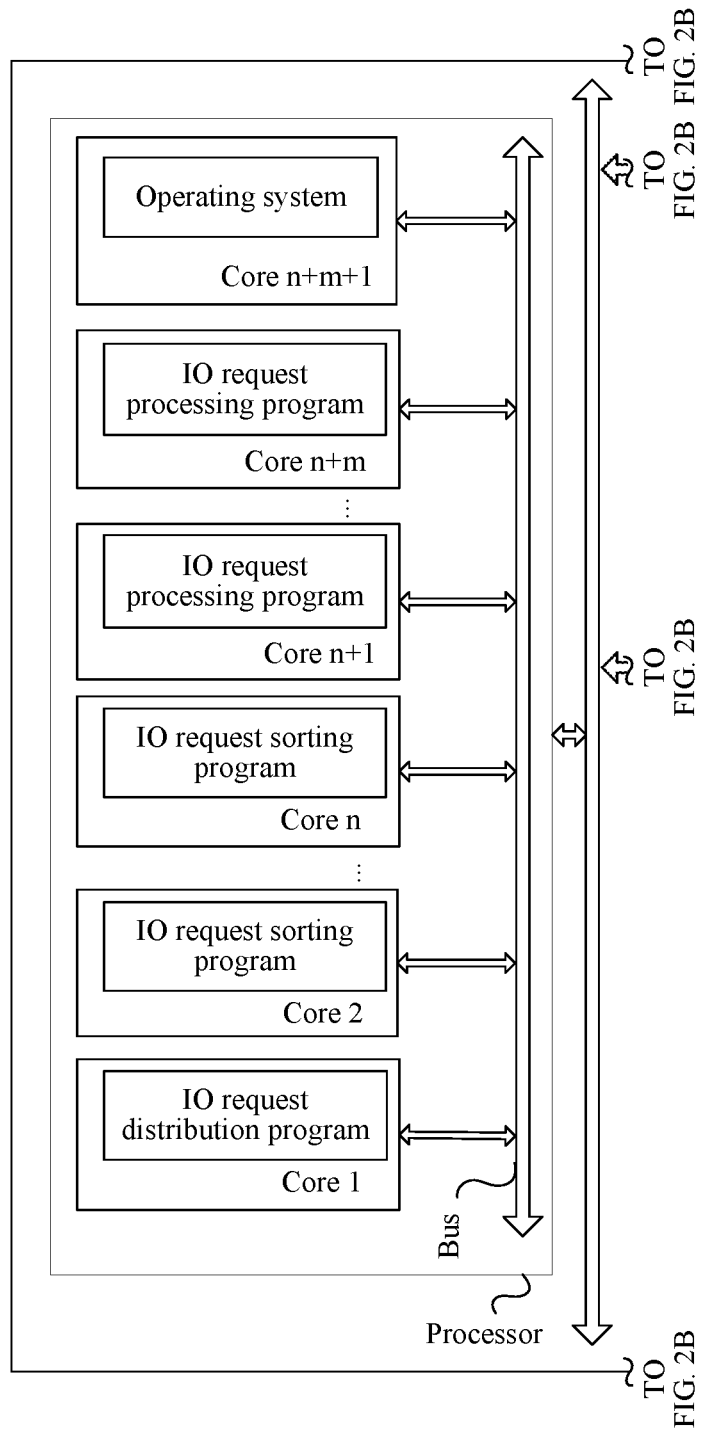
FIG. 2A and FIG. 2B are a schematic diagram of an organizational structure of a storage controller.
Figure 2B:
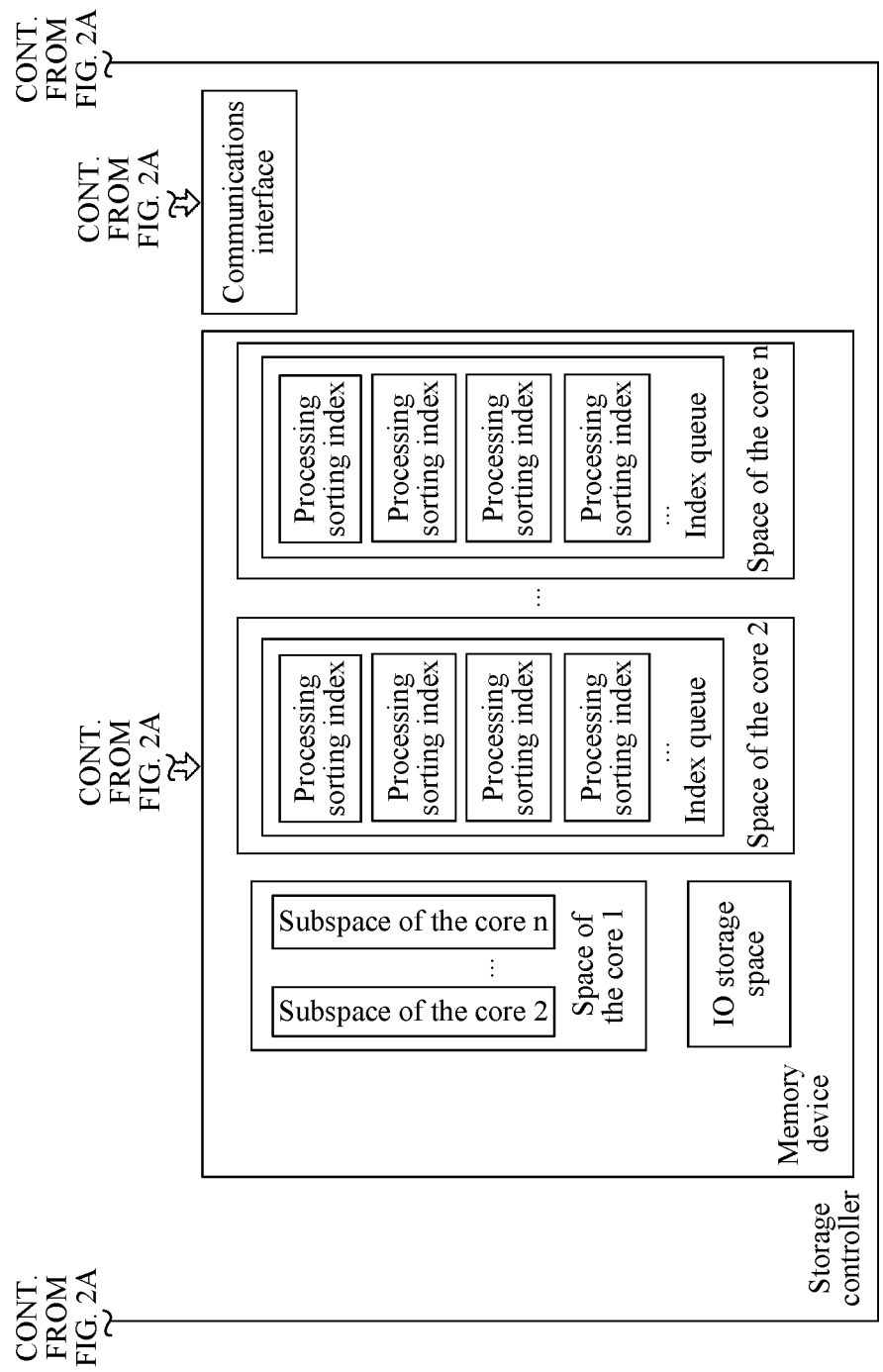

An architecture of a storage controller applied to an embodiment of this application As shown in FIG. 2A and FIG. 2B, a storage controller usually includes a plurality of cores, a memory device, and a communications interface. Each core establishes a communication connection to the memory device. The storage controller communicates with a client and a storage medium using the communications interface. An IO request obtained from the communications interface is stored into IO storage space of the memory device.

There are mainly three types of programs playing a role in a process of scheduling and processing an IO request an IO request distribution program, an IO request sorting program, and an IO request processing program. The IO request distribution program, the IO request sorting program, and the IO request processing program each are implemented by a core by running code in the memory device. A core that runs the IO request distribution program is referred to as a distribution core. A core that runs the IO request sorting program is referred to as a sorting core. A core that runs the IO request processing program is referred to as a request processing core.

A quantity of cores to be allocated to each of the three types of programs may be determined according to running pressure of the three types of programs. For a specific core on which each program runs, the program may also be migrated according to a load status of each core. In FIG. 2A and FIG. 2B, for example, a core 1 is configured to execute an IO request distribution program, a core 2 to a core n are configured to execute IO request sorting programs, a core n+1 to a core n+m are configured to execute IO request processing programs, and a core n+m+1 is configured to execute an operating system of the storage controller.

The IO request distribution program distributes the IO request in the IO storage space, that is, distributes the IO request to a subspace of each core that runs an IO request sorting program. In FIG. 2A and FIG. 2B, for example, subspaces of the core 2 to the core n are located in space of the core 1. In practice, alternatively, the subspaces of the core 2 to the core n may be located outside the space of the core 1, or be located in respective space of each core.

In a process in which the IO request distribution program distributes the IO request, subsequent load balance of each IO request sorting program is mainly considered, but distributing, to space of a core, all IO requests that point to a LUN is not considered. For example, the IO request distribution program may distribute a plurality of received IO requests one by one to IO request sorting programs, so as to ensure that quantities of IO requests distributed to the IO request sorting programs are the same.

Subsequently, each IO request sorting program reads IO requests distributed to the IO request sorting program, and sorts the IO requests. A sorting result is stored in an index queue in space of a core in which each IO request sorting program is located. The index queue may be implemented using different data structures, such as a pile or a first in first out queue. Each IO request sorting program generates a processing sorting index for each IO request in a subspace for the IO request sorting program, and then sorts the processing sorting indexes that are of IO requests and that are in the index queue for the IO request sorting program. An IO request with a small processing sorting index is preferentially processed by an idle IO request processing program.

The IO request processing program may specifically perform, according to a type of an IO request, a write operation or a read operation corresponding to the IO request. Alternatively, the IO request processing program may be configured to perform arrangement, deduplication, or the like on data carried in an IO request.

For example, a storage array in which the storage controller is located uses block storage, and storage media of the storage array are virtualized into 100 LUNs. Because of a service requirement, IOPS parameters need to be set for some LUNs. Each IO request received by the storage controller points to a LUN. Because a speed at which the client generates an IO request is not constant, a quantity of IO requests that are generated per second and that point to different LUNs may vary significantly. Because processing efficiency of the IO request processing program is limited, a sorting result of the IO request sorting program affects whether an IOPS parameter of each LUN can be fulfilled. For example, an IOPS parameter of a LUN 1 is 1000, and an IOPS parameter of a LUN 2 is 200. However, 1000 IO requests that point to the LUN 1 and 2000 IO requests that point to the LUN 2 are stored in the IO storage space of the memory device at a moment because a relatively large quantity of IO requests that point to the LUN 2 are generated within a period of time. The 3000 IO requests are distributed to IO request sorting programs on the core 2 to the core n+1 for sorting. If each IO request sorting program schedules the IO requests only according to the IOPS parameter of the LUN 1 and the IOPS parameter of the LUN 2, finally, it is usually difficult to fulfill the IOPS parameter of the LUN 1 and the IOPS parameter of the LUN 2 by processing sorting indexes calculated by the n IO request sorting programs for the 3000 IO requests. If the IO request sorting programs communicate with each other in a process of generating the processing sorting indexes, although this helps reach a lower limit of IOPS parameter of each LUN, communication overheads between the IO request sorting programs are extremely high.

This application provides an IO request processing method. The method is applicable to the storage controller shown in FIG. 2A and FIG. 2B.

Figure 3:
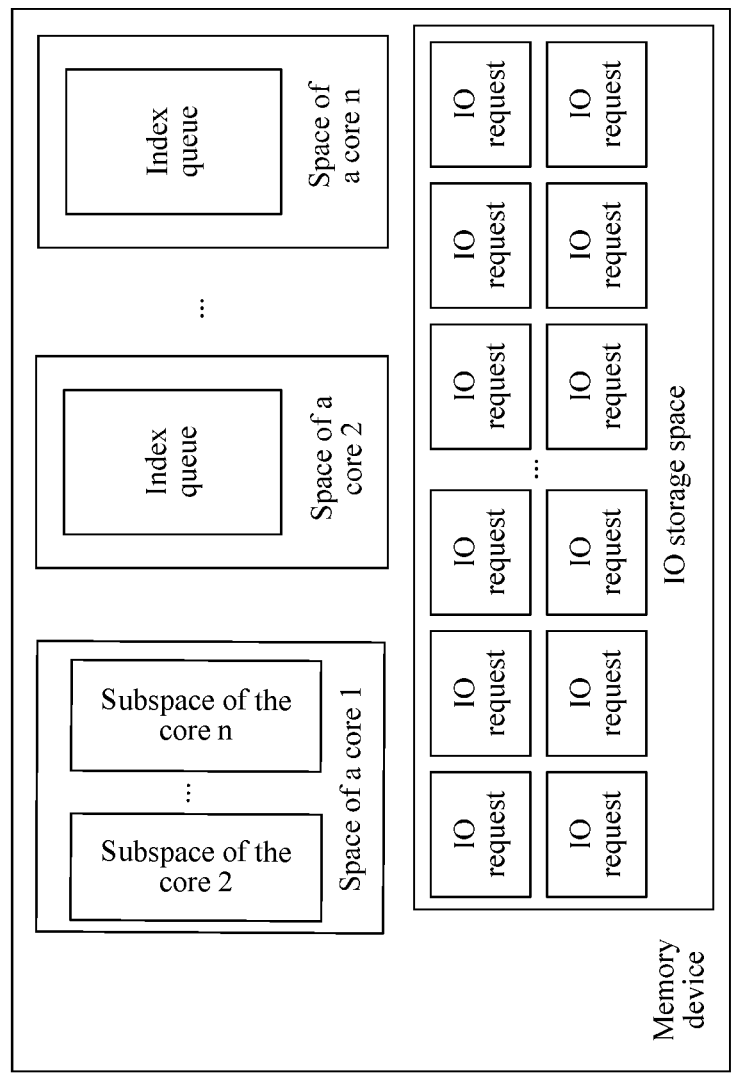
FIG. 3 is a schematic diagram of an organizational structure of a memory device of a storage controller.

As shown in FIG. 3, a communications interface receives a plurality of IO requests sent by a client, and stores the plurality of IO requests into IO storage space.

An IO request distribution program generates IO description information for each IO request, and establishes a mapping relationship between each IO request and the IO description information of the IO request. The IO description information of each IO request includes a LUN ID carried in metadata of the IO request.

Because the IO request occupies relatively large space, the IO description information may be generated for each IO request in a process of sorting IO requests. Subsequently, an IO request sorting program generates a processing sorting index for an IO request according to IO description information of the IO request, so as to reduce read/write load of a memory device.

Figure 4:
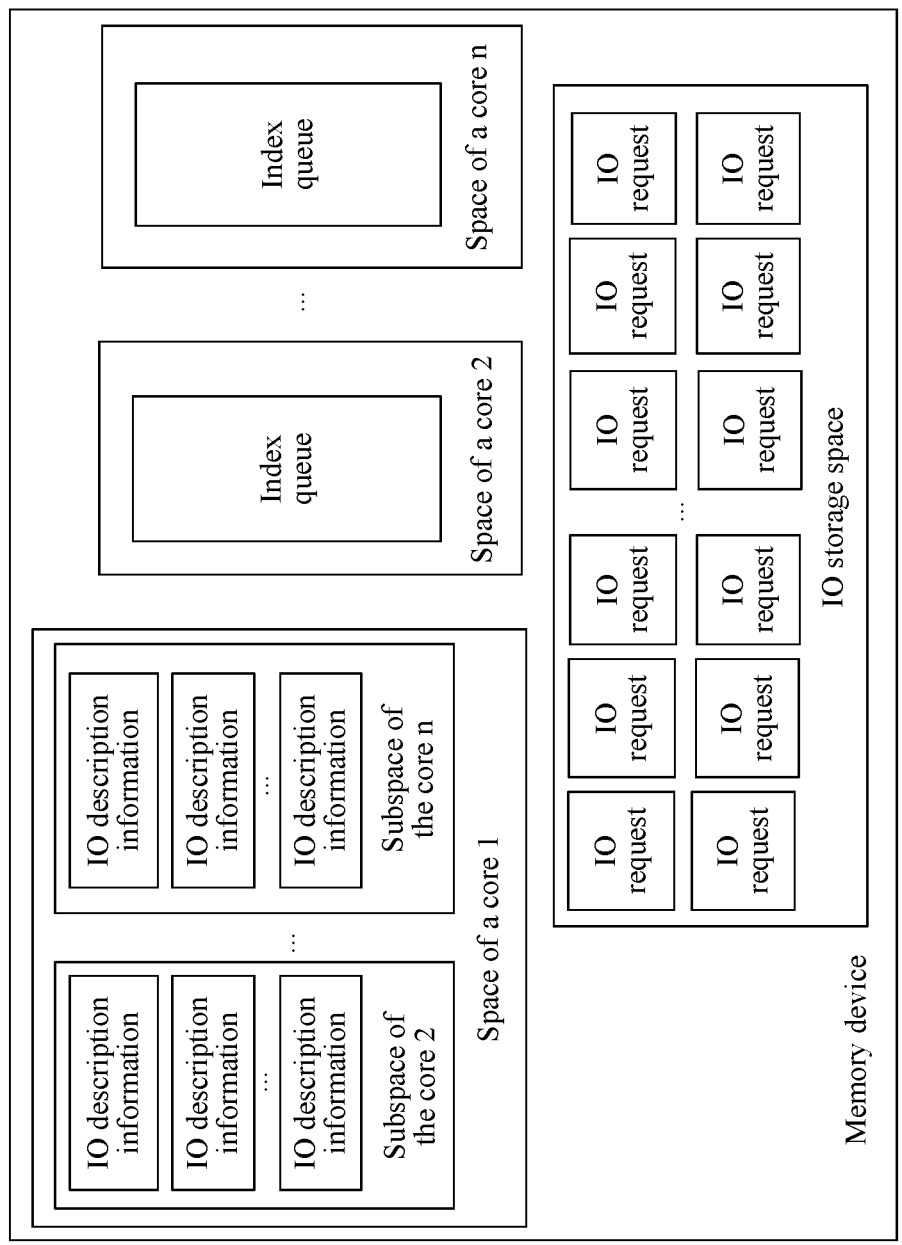
FIG. 4 is a schematic diagram of an organizational structure of a memory device of a storage controller.

As shown in FIG. 4, the IO request distribution program distributes a plurality of pieces of IO description information to subspaces of cores in which IO request sorting programs are located.

The IO request distribution program may build a queue for each LUN in a subspace of a core in which each IO request sorting program is located, and store, into the queue of each LUN, IO description information allocated to a subspace of a core in which an IO request sorting program is located, so that the IO request sorting program identifies, in a subsequent step, a LUN to which each piece of IO description information points.

Figure 5A:
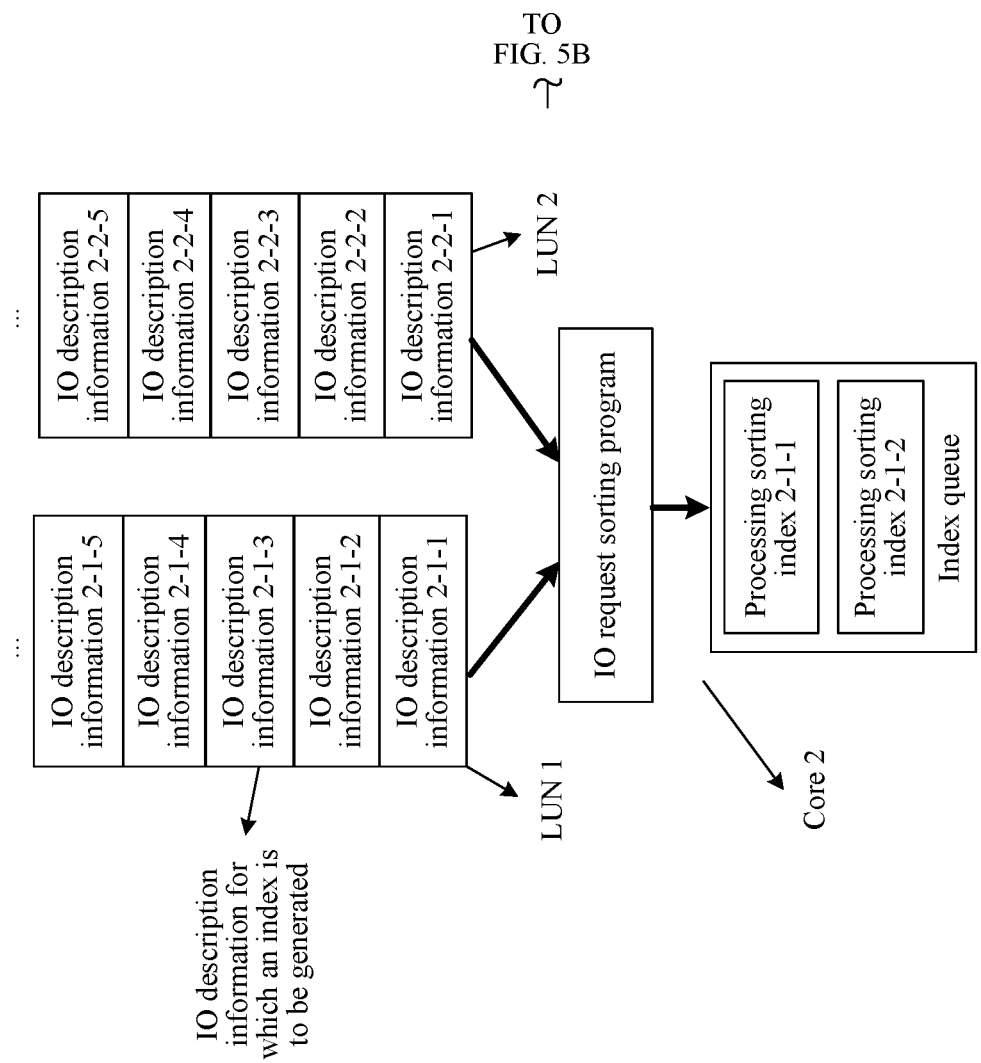
FIG. 5A and FIG. 5B are a schematic diagram of a process of generating a processing sorting index.
Figure 5B:
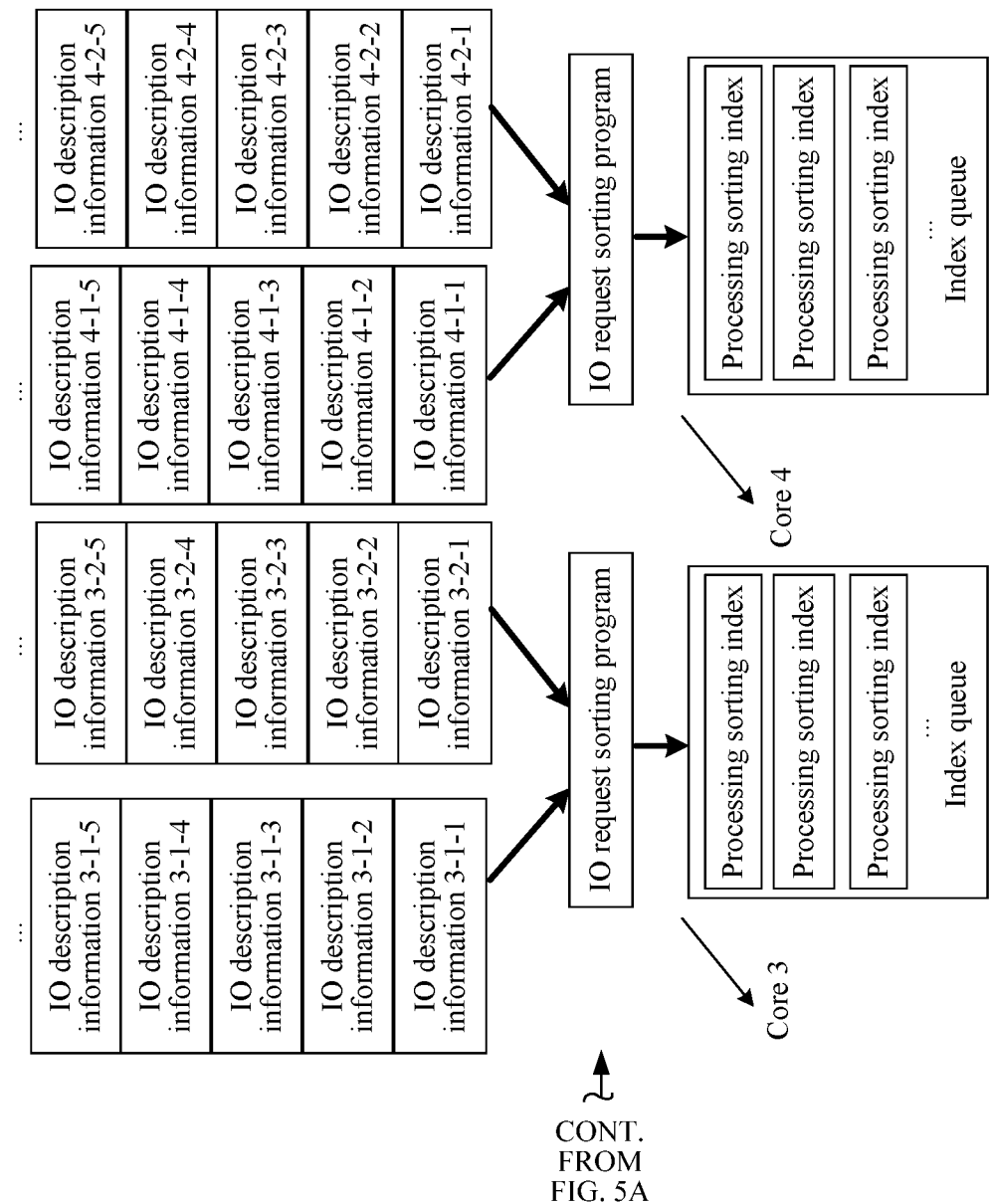

The following describes, with reference to FIG. 5A and FIG. 5B, how an IO request sorting program running on a core 2 generates a processing sorting index for a piece of IO description information. In a running process, each IO request sorting program uses a same method to generate a processing sorting index for each piece of IO description information.

In FIG. 5, IO description information A-B-C indicates $C^{th}$ IO description information that points to a LUN B and that is distributed to an IO request sorting program running on a core A. Correspondingly, a processing sorting index A-B-C indicates a processing sorting index of the IO description information A-B-C.

For example, the IO request sorting program running on the core 2 currently generates a processing sorting index for IO description information 2-1-3. Therefore, a processing sorting index of IO description information 2-1-1 and that of IO description information 2-1-2 have been stored by the IO request sorting program into an index queue of the core 2.

The IO request sorting program running on the core 2 obtains the IO description information 2-1-3 from a subspace of the core 2, to obtain a LUN ID corresponding to the IO description information.

The IO request sorting program running on the core 2 obtains an IOPS parameter of a LUN 1 according to the LUN ID.

The IO request sorting program running on the core 2 obtains an accumulative index quantity of the LUN 1. The accumulative index quantity of the LUN 1 indicates a quantity of IO description information that points to the LUN 1 and for which all IO request sorting programs have generated processing sorting indexes since the IO request sorting program running on the core 2 generated a processing sorting index for the IO description information 2-1-2.

Because each IO request sorting program continuously generates a processing sorting index for IO description information distributed to the IO request sorting program, during a period from a moment at which the IO request sorting program running on the core 2 generates the processing sorting index for the IO description information 2-1-2 to a moment at which the IO request sorting program running on the core 2 generates the processing sorting index for the IO description information 2-1-3, another IO request sorting program also generates a processing sorting index for a specific quantity of IO description information that points to the LUN 1. The quantity is an accumulative index quantity of the LUN 1 when the IO request sorting program running on the core 2 generates the processing sorting index for the IO description information 2-1-3.

Likewise, an accumulative index quantity of the LUN 1 when the IO request sorting program running on the core 2 generates the processing sorting index for the IO description information 2-1-2 is a quantity of IO description information that points to the LUN 1 and for which a remaining IO request sorting program generates a processing sorting index during a period from a moment at which the IO request sorting program running on the core 2 generates the processing sorting index for the IO description information 2-1-1 to a moment at which the IO request sorting program running on the core 2 generates the processing sorting index for the IO description information 2-1-2.

The IO request sorting program running on the core 2 obtains a current system time using an interface of an operating system.

The current system time may specifically represent a quantity of nanoseconds that elapse during a period from a moment at which a storage controller starts to a moment at which the storage controller invokes the interface of the operating system.

The IO request sorting program running on the core 2 calculates the processing sorting index 2-1-3 of the IO description information 2-1-3.

The processing sorting index 2-1-3=Max {processing sorting index 2-1-2+K×accumulative index quantity of the LUN 1/IOPS parameter of the LUN 1, system time}. Herein, K is a positive number, and a common value of K is 1.

If the IO request sorting program running on the core 2 currently generates a processing sorting index for the processing sorting index 2-1-1, because the processing sorting index 2-1-1 is a processing sorting index of a first IO request that points to the LUN 1 and that is distributed to the IO request sorting program running on the core 2, the processing sorting index 2-1-1=Max {initial processing sorting index+K×accumulative index quantity of the LUN 1/IOPS parameter of the LUN 1, system time}. The initial processing sorting index may be 0.

The IO request sorting program running on the core 2 stores the processing sorting index 2-1-3 into the index queue.

A correspondence is established between the IO description information 2-1-3 and the processing sorting index 2-1-3, or a correspondence is established between the processing sorting index 2-1-3 and an IO request for which the IO description information 2-1-3 is generated, so that the IO request corresponding to the processing sorting index 2-1-3 can be determined in a subsequent step.

By performing the foregoing steps, each IO request sorting program generates a processing sorting index for each piece of IO description information distributed to the IO request sorting program, and stores the generated processing sorting index into an index queue. Therefore, processing sorting indexes of IO requests that are not processed are stored in index queues of the core 2 to a core n.

After an IO request processing program running on any core completes processing of an IO request, the operating system learns that the IO request processing program enters an idle state.

A processing sequence of each IO request processing program is recorded in the operating system, that is, a specific index queue including an IO request that corresponds to a minimum processing sorting index and that is to be subsequently processed by an IO request processing program after the IO request processing program enters an idle state. To ensure that an IOPS parameter is fulfilled, the processing sequence needs to allow an IO request processing program to process processing sorting indexes in index queues in a same or similar frequency, that is, an IO request processing program periodically processes an IO request corresponding to a minimum processing sorting index in each index queue.

The processing sequence may be that, in a sequence from the core 2 to the core n, each IO request processing program polls all index queues, and processes an IO request corresponding to a minimum processing sorting index in an index queue accessed each time. Each time after an IO request corresponding to a minimum processing sorting index in an index queue is processed, the idle IO request processing program processes an IO request corresponding to a minimum processing sorting index in a next index queue.

Alternatively, if m=n+1, that is, a quantity of IO request sorting programs is the same as that of IO request processing programs, the operating system binds the IO request processing programs and index queues one by one. In this case, when an IO request processing program enters an idle state, the operating system determines that the idle IO request processing program subsequently processes an IO request corresponding to a minimum processing sorting index in an index queue corresponding to the idle IO request processing program.

After the operating system determines a specific index queue including the IO request that corresponds to a minimum processing sorting index and that is to be subsequently processed by the idle IO request processing program, the operating system selects the minimum processing sorting index from the index queue, and instructs the idle IO request processing program to process the IO request corresponding to the minimum processing sorting index; or the operating system instructs the idle IO request processing program to access the index queue, and processes the IO request corresponding to the minimum processing sorting index in the index queue.

A sequence of performing some of the foregoing steps may be adjusted. The step of obtaining the IOPS parameter of the LUN 1 and the step of obtaining the system time each may be performed at any moment before the processing sorting index 2-1-3 is generated.

The step of obtaining the system time is an optional step. When the step is not performed, the generated processing sorting index 2-1-3=processing sorting index 2-1-2+K×accumulative index quantity of the LUN 1/IOPS parameter of the LUN 1.

The idle IO request processing program preferentially processes the IO request corresponding to the minimum processing sorting index in each index queue. Therefore, for the IO request sorting program running on the core 2, if no IO request that points to a LUN 2 is distributed within a period of time, but an IO request that points to another LUN is continuously distributed within the period of time, within a subsequent period of time, once the IO request that points to the LUN 2 is distributed to the IO request sorting program running on the core 2, all processing sorting indexes of the IO requests that point to the LUN 2 may be smaller than a processing sorting index of the IO request that points to the another LUN. As a result, the IO request that points to the LUN 2 is continuously and preferentially processed by the idle IO request processing program, and the IO request that points to the another LUN is accordingly hungry. Therefore, the system time is considered into calculation of the processing sorting index, so as to avoid a case in which when there is an idle LUN, an IO request that points to another LUN is blocked after an IO request that points to the idle LUN is subsequently distributed to the IO request sorting program, so that IO request scheduling precision is improved.

For example, at a moment 1, processing sorting indexes recorded in the index queue of the core 2 include:

processing sorting index 2-1-1=3 processing sorting index 2-2-1=2.2 processing sorting index 2-1-2=3.5 processing sorting index 2-2-2=2.8 processing sorting index 2-1-3=5.5 processing sorting index 2-2-3=3.0

At a moment 2, all IO requests corresponding to the processing sorting indexes that have been stored in the index queue at the moment 1 have been processed, and new processing sorting indexes generated between the moment 1 and the moment 2 include:

processing sorting index 2-1-4=6
processing sorting index 2-1-5=7.5
processing sorting index 2-1-6=9.5
processing sorting index 2-1-7=10.5
processing sorting index 2-1-8=12

That is, during a period from the moment 1 to the moment 2, no new IO description information that points to the LUN 2 is distributed to the IO request sorting program running on the core 2. Therefore, after the moment 2, if the system time is not considered into the calculation of the processing sorting index, and new IO description information that points to the LUN 2 is distributed to the IO request sorting program running on the core 2, a processing sorting index of the new distributed IO description information that points to the LUN 2 is much smaller than a processing sorting index of IO description information that points to the LUN 1. As a result, when accessing the index queue of the core 2, the idle IO request processing program continuously processes a new distributed IO request that points to the LUN 2. If the system time is considered into the calculation of the processing sorting index, the processing sorting index of the new distributed IO description information that points to the LUN 2 may be equal to the current system time, and may not be much smaller than the processing sorting index of the IO description information that points to the LUN 1.

Therefore, the system time is considered into the calculation of the processing sorting index, so as to avoid a case in which when there is an idle LUN, an IO request that points to another LUN is blocked after an IO request that points to the idle LUN subsequently arrives, so that IO request scheduling precision is improved.

Figure 6:
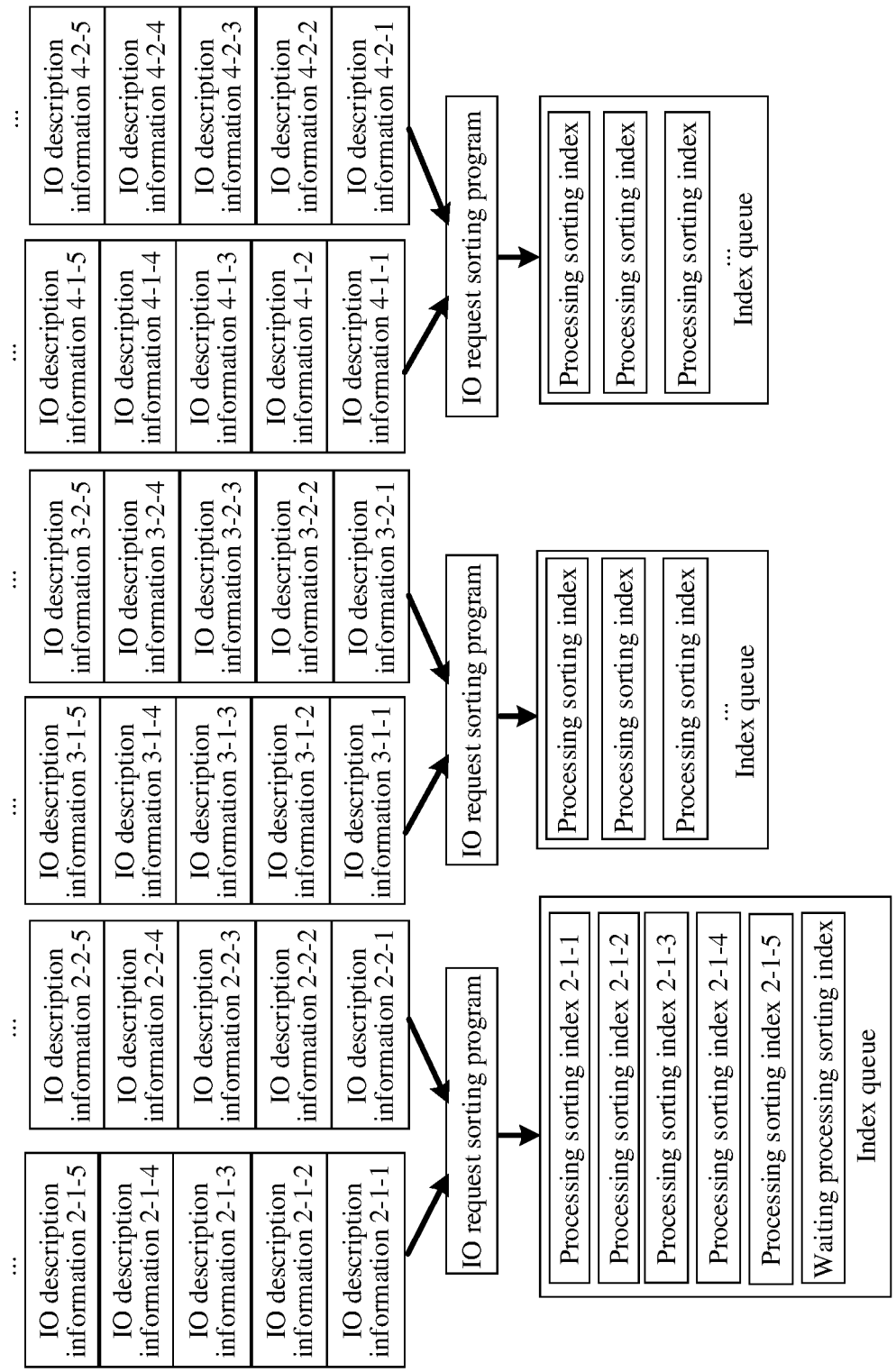
FIG. 6 is a schematic diagram of a process of generating a processing sorting index.

In a process of performing the foregoing steps, if the IO request sorting program running on the core 2 determines, at a moment in the index queue of the core 2, that all IO description information that points to the LUN 1 has been processed, as shown in FIG. 6, after the processing sorting index 2-1-5 is generated, if in the IO description information distributed to the IO request sorting program running on the core 2, there is no IO description information that points to the LUN 1 and for which a processing sorting index is not generated, the IO request sorting program running on the core 2 generates an awaiting processing sorting index, and stores the awaiting processing sorting index into the index queue of the core 2.

The awaiting processing sorting index=processing sorting index 2-1-5+K×accumulative index quantity of the LUN 1 at the moment/IOPS parameter of the LUN 1.

The accumulative index quantity of the LUN 1 at the moment indicates a quantity of IO description information that points to the LUN 1 and for which a remaining IO request sorting program has generated a processing sorting index since the IO request sorting program running on the core 2 generated the processing sorting index for IO description information 2-1-5.

The awaiting processing sorting index is eliminated in one of the following two cases. In Case 1, after the awaiting processing sorting index is generated, IO description information that points to the LUN 1 is distributed to the IO request sorting program running on the core 2. In Case 2, a time in which the awaiting processing sorting index exists exceeds a preset threshold.

The generating the awaiting processing sorting index is an optional step. A processing sorting index in each index queue is sorted together with an awaiting processing sorting index. If in a process of selecting, for the idle IO request processing program, an IO request to be processed subsequently, the operating system determines that a minimum processing sorting index in a current index queue is an awaiting processing sorting index, because the awaiting processing sorting index does not correspond to any IO request, the idle IO request processing program cannot process an IO request corresponding to a processing sorting index in the index queue. The operating system needs to re-select an index queue for the idle IO request processing program.

For example, the idle IO request processing program polls index queues of the cores in a sequence from the core 2 to the core n. In this case, if the idle IO request processing program currently polls an index queue of a core 3, but finds that a minimum processing sorting index in the index queue of the core 3 is an awaiting processing sorting index, the idle IO request processing program skips the index queue of the core 3, and accesses an index queue of a core 4.

Quantities of IO description information that points to different LUNs and that is distributed to each IO request sorting program are different, and a speed at which the IO request sorting program generates a processing sorting index for an IO request is usually much higher than a speed at which the IO request processing program processes an IO request. Therefore, if no awaiting processing sorting index is generated and there are few pieces of IO description information that points to the LUN 2 and that is distributed to the IO request sorting program running on the core 2, IO description information with a minimum processing sorting index in the index queue of the core 2 may always point to the LUN 1. As a result, the idle IO request processing program continuously processes the IO request that points to the LUN 1. Finally, it is difficult to fulfill an IOPS parameter of the LUN 2.

For example, at a moment 1, processing sorting indexes stored in the index queue of the core 2 include:

processing sorting index 2-1-1=3 processing sorting index 2-2-1=2.2 processing sorting index 2-1-2=3.5 processing sorting index 2-2-2=2.8 processing sorting index 2-1-3=5.5 processing sorting index 2-2-3=3.0

At a moment 2, IO requests corresponding to some of the processing sorting indexes that have been generated at the moment 1 have been processed. In addition, a new processing sorting index is generated during a period from the moment 1 to the moment 2. In this case, processing sorting indexes recorded in the index queue of the core 2 include:

processing sorting index 2-1-4=6 processing sorting index 2-2-4=3.4 processing sorting index 2-1-5=7.5 processing sorting index 2-1-6=9.5

If within a subsequent period of time, no IO description information that points the LUN 2 is distributed to the IO request sorting program running on the core 2, but the IO description information that points to the LUN 1 is continuously distributed to the IO request sorting program running on the core 2, after an IO request corresponding to the processing sorting index 2-2-4 is processed, if no awaiting processing sorting index is generated, once the idle IO request processing program accesses the index queue of the core 2, the idle IO request processing program continuously processes the IO request that points to the LUN 1. Consequently, the IOPS parameter of the LUN 2 cannot be fulfilled.

On the contrary, if an awaiting processing sorting index 2-2-6 is generated using the foregoing method, an IO request corresponding to a processing sorting index greater than the awaiting processing sorting index 2-2-6 cannot be processed by the idle IO request processing program before the awaiting processing sorting index 2-2-6 is eliminated. Consequently, the idle IO request processing program needs to access another index queue. Therefore, using the awaiting processing sorting index, IO request scheduling precision can be improved, and an IOPS parameter fulfillment rate can be increased.

In the foregoing steps, when the processing sorting index is generated for the processing sorting index 2-1-3, the accumulative index quantity of the LUN 1 may be specifically obtained in one of the following two manners.

Manner 1:

A shared counter is maintained for each LUN in a memory device. Each IO request sorting program can read/write P shared counters. Initial values of the shared counters are the same. After generating a processing sorting index of IO description information that points to the LUN 1, each IO request sorting program increases a value of a shared counter for the LUN 1 by 1. Therefore, if initial values of all shared counters are 0, the P shared counters respectively record quantities of IO description information that points to P LUNs and for which processing sorting indexes have been generated.

For each core that runs an IO request sorting program, a private counter is maintained for each LUN. P private counters of a core can be read/written by only an IO request sorting program running on the core. Initial values of all private counters of a core are the same. After generating a processing sorting index of IO description information that points to the LUN 1, the IO request sorting program running on the core 2 updates, using the value of the shared counter for the LUN 1, a value of a private counter that is of the core 2 and that corresponds to the LUN 1, that is, copies the value of the shared counter for the LUN 1 to the private counter that is of the core 2 and that corresponds to the LUN 1. Therefore, each time the IO request sorting program running on the core 2 calculates a processing sorting index of IO description information that points to a LUN a, a value of a private counter b-a is equal to a value of a shared counter a after the IO request sorting program running on the core 2 calculates a processing sorting index of a previous piece of IO description information that points to the LUN a.

The shared counter a represents a shared counter that points to the LUN a. A private counter b-c represents a private counter that is of an IO request sorting program running on a core b and that corresponds to a LUN c. In practice, the shared counter and the private counter may be implemented in a plurality of manners. For example, each private counter may be set in space of a core in which an IO request sorting program to which the private counter belongs is located, or private counters in space of cores may be combined into a table, and the table is set in storage space of the memory device. An IO request sorting program can access only a region that is in the table and that corresponds to a private counter of the IO request sorting program. For another example, all shared counters may also be combined into a table, and the table is set in storage space of the memory device. Each IO request sorting program can access the table. All the shared counters and the private counters are established by the operating system before the storage controller starts to distribute the IO description information.

Therefore, when Manner 1 is used, the obtaining the accumulative index quantity of the LUN 1 includes the following steps.

1.1. Obtain a value of a shared counter 1 and a value of a private counter 2-1, and calculate a difference between the two values, where the difference is the accumulative index quantity of the LUN 1.

1.2. Increase the value of the shared counter 1 by 1.

1.3. Update the private counter 2-1 using the value of the shared counter 1.

Figure 7A:
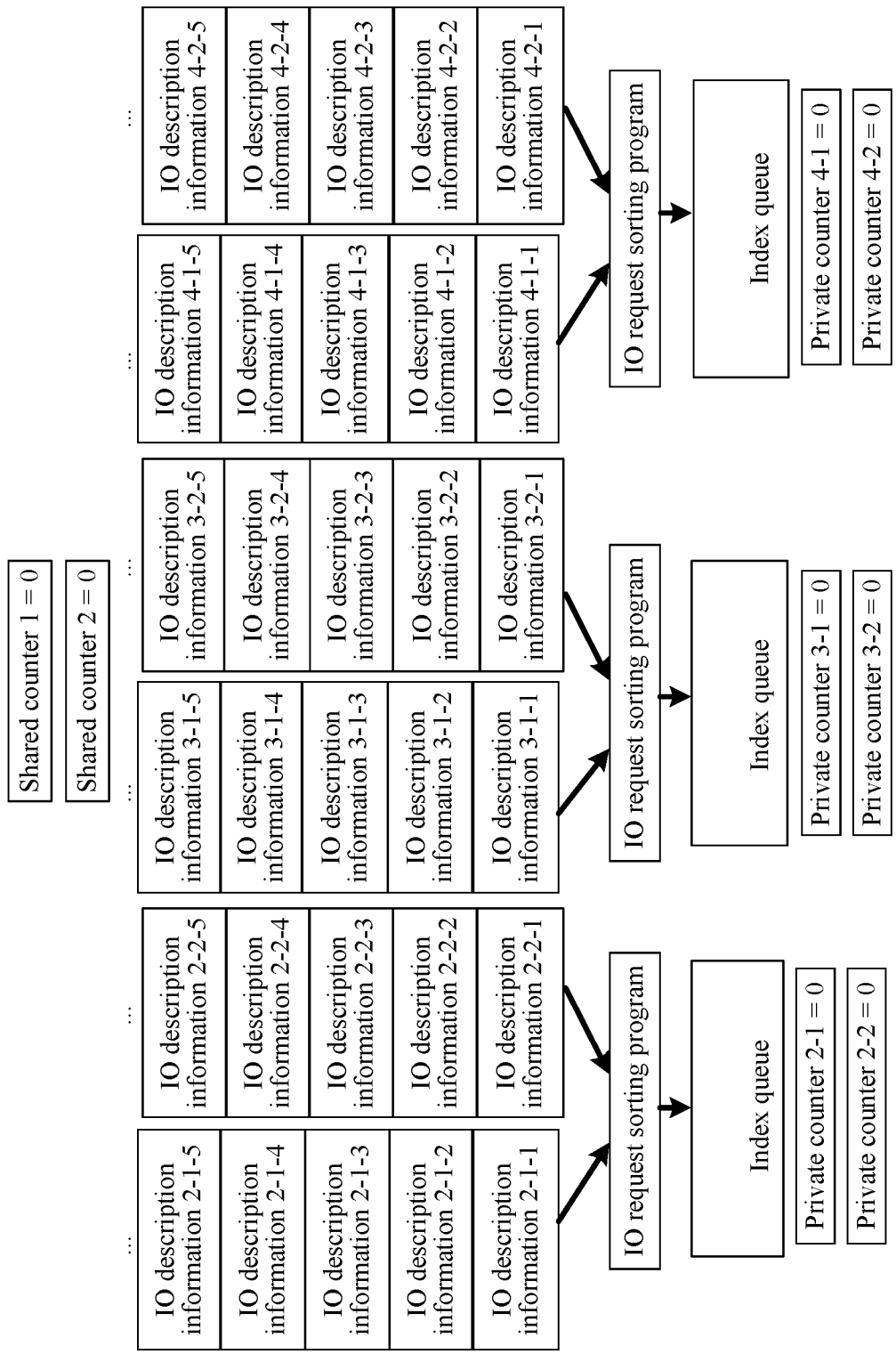
FIGS. 7A, 7B, 7C, 7D, and 7E are schematic diagrams of a process of generating a processing sorting index.

For example, a processor includes three sorting cores. FIG. 7A shows an initial state, and initial values of the shared counter 1, a shared counter 2, and each private counter are all 0. In FIG. 7A, IO description information a-b-c indicates $c^{th}$ IO description information that points to a LUN b and that is distributed to a core a. An initial processing sorting index of IO description information that points to the LUN 1 and that of IO description information that points to the LUN 2 are both 0. An IOPS parameter of the LUN 1 is 1000, and an IOPS parameter of the LUN 2 is 500.

Figure 7B:
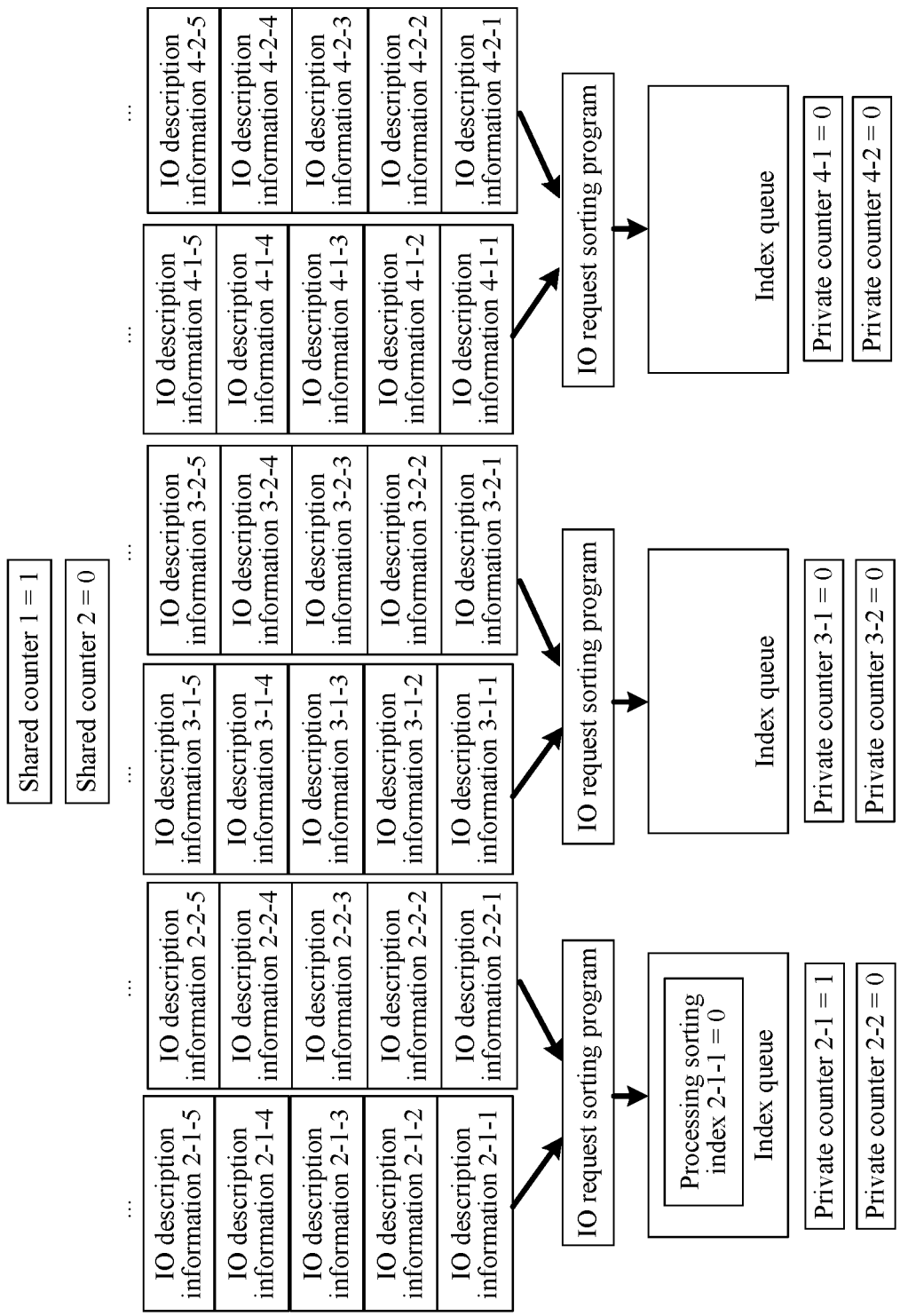

At a moment T1, an IO request sorting program running on a core 2 calculates a processing sorting index for IO description information 2-1-1. Subsequently, the value of the shared counter 1 is increased by 1, and the value of the private counter 2-1 is updated using the value of the shared counter 1, as shown in FIG. 7B.

Figure 7C:
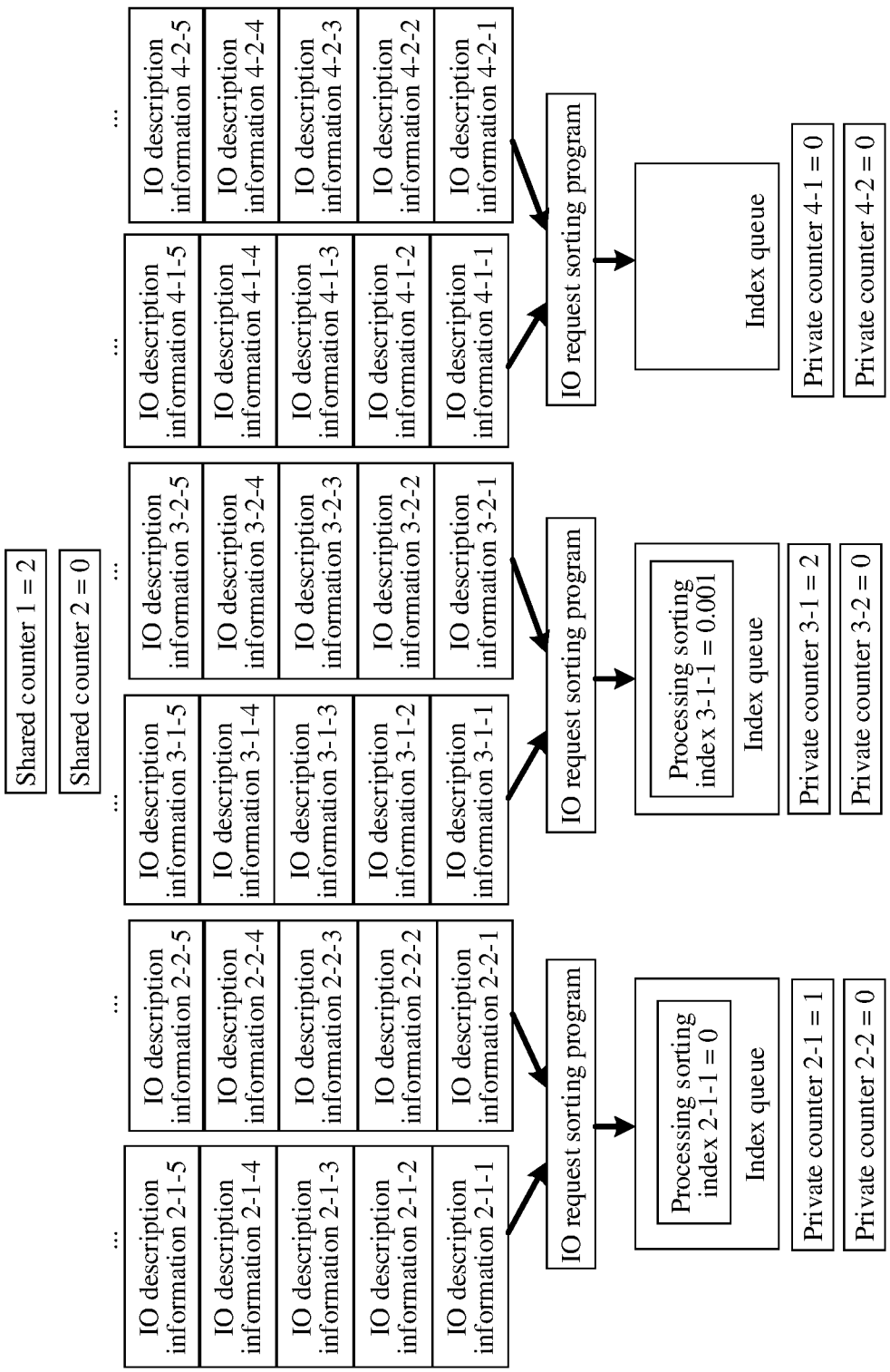

At a moment T2, an IO request sorting program running on a core 3 calculates a processing sorting index for IO description information 3-1-1. Subsequently, the value of the shared counter 1 is increased by 1, and a value of a private counter 3-1 is updated using the value of the shared counter 1, as shown in FIG. 7C.

At a moment T3, an IO request sorting program running on a core 4 calculates a processing sorting index for IO description information 4-1-1. Subsequently, the value of the shared counter 1 is increased by 1, and a value of a private counter 4-1 is updated using the value of the shared counter 1.

Figure 7D:
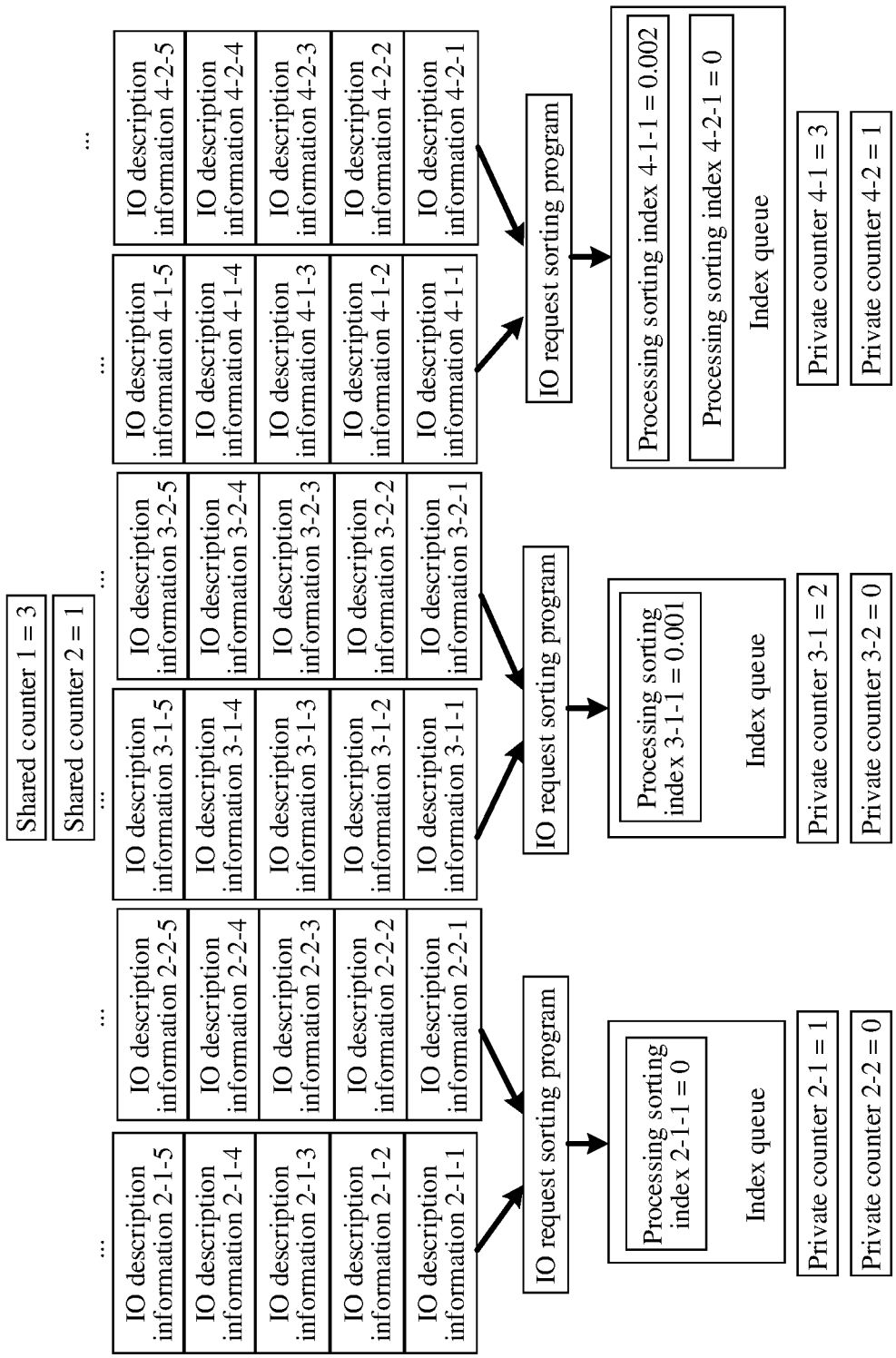

At a moment T4, the IO request sorting program running on the core 4 calculates a processing sorting index for IO description information 4-2-1. Subsequently, the value of the shared counter 2 is increased by 1, and a value of a private counter 4-2 is updated using the value of the shared counter 2, as shown in FIG. 7D.

At a moment T5, the IO request sorting program running on the core 2 calculates a processing sorting index for IO description information 2-1-2. Subsequently, the value of the shared counter 1 is increased by 1, and the value of the private counter 2-1 is updated using the value of the shared counter 1.

Figure 7E:
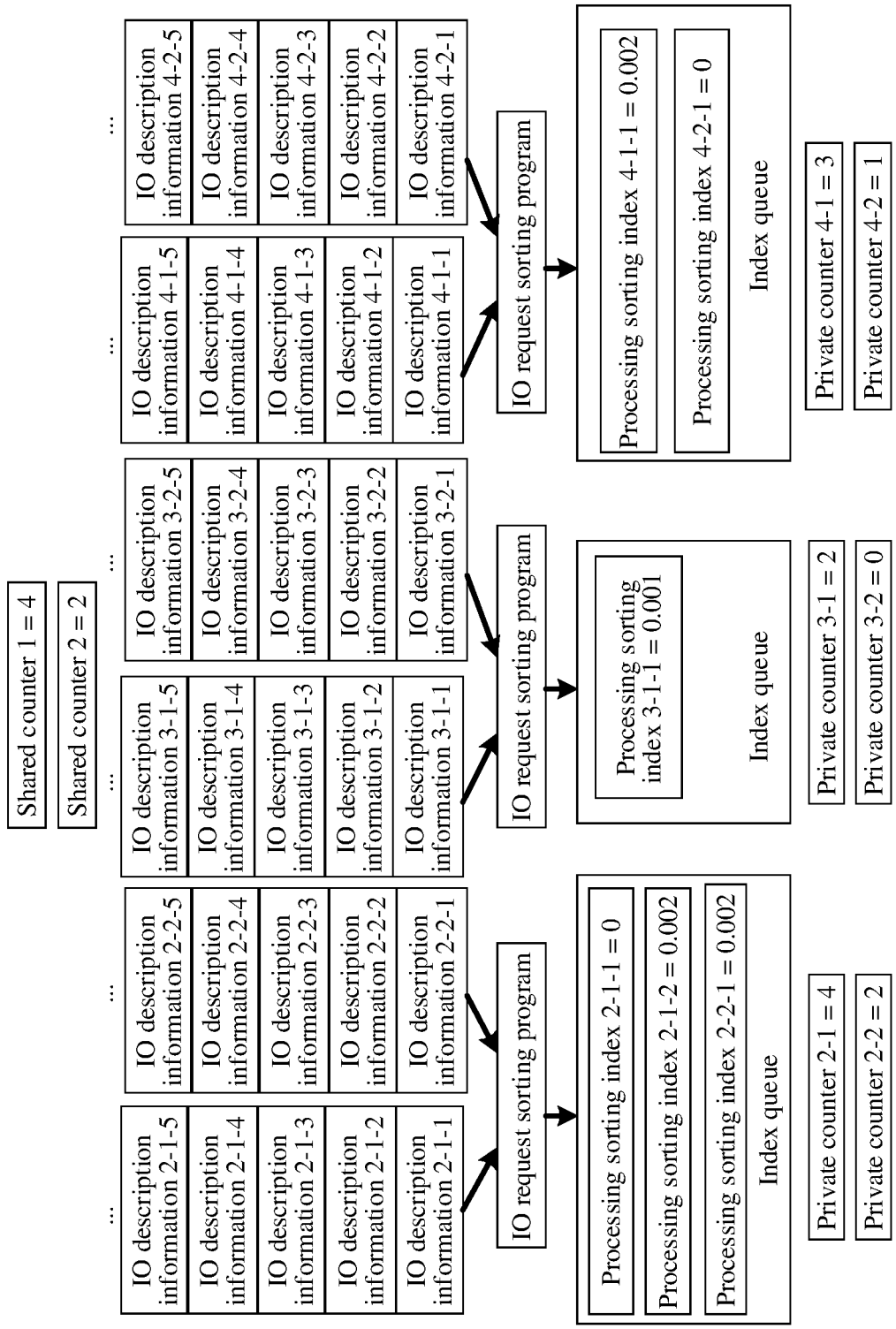

At a moment T6, the IO request sorting program running on the core 2 calculates a processing sorting index for IO description information 2-2-1. Subsequently, the value of the shared counter 2 is increased by 1, and a value of a private counter 2-2 is updated using the value of the shared counter 2, as shown in FIG. 7E.

A process of subsequently generating a processing sorting index for remaining IO description information is deduced by analogy.

In the example corresponding to FIGS. 7A, 7B, 7C, 7D, and 7E, impact of the system time on the process of generating the processing sorting index is not considered.

Manner 2:

A core that runs an IO request sorting program maintains two private counters for each LUN. A private counter A-B-1 represents a first private counter that is of a core A and that corresponds to a LUN B, and a private counter A-B-2 represents a second private counter that is of the core A and that corresponds to the LUN B. 2×P private counters of a core can be written by only an IO request sorting program running on the core, and P first private counters of a core can be read by any IO request sorting program. Initial values of all private counters of a core are the same. After generating a processing sorting index of IO description information that points to the LUN B, an IO request sorting program running on the core A increases a value of the private counter A-B-1 by 1, and then updates the private counter A-B-2 using a sum of first private counters for the LUN B of IO request sorting programs.

The private counter may be implemented in a plurality of manners. For example, each private counter may be set in space of a core in which an IO request sorting program to which the private counter belongs is located, or private counters in space of cores are combined into a table, and the table is set in storage space of the memory device. All the private counters are established by the operating system before the storage controller starts to distribute the IO description information.

Therefore, when Manner 2 is used, the obtaining the accumulative index quantity of the LUN 1 includes the following steps.

2.1. Obtain values of first private counters for the LUN 1 of IO request sorting programs running on cores, and sum the values of the first private counters for the LUN 1 of the IO request sorting programs running on the cores.

2.2. Calculate a difference between a summing result and a second private counter for the LUN 1 of the IO request sorting program running on the core 2, where the difference is the accumulative index quantity of the LUN 1.

2.3. Increase a value of a private counter 2-1-1 by 1.

2.4. Update a private counter 2-1-2 using the sum of the values of the first private counters that are of the cores and that correspond to the LUN 1.

In 2.4, alternatively, a value obtained by adding 1 to the summing result obtained in 2.1 may be used to update the private counter 2-1-2.

Figure 8A:
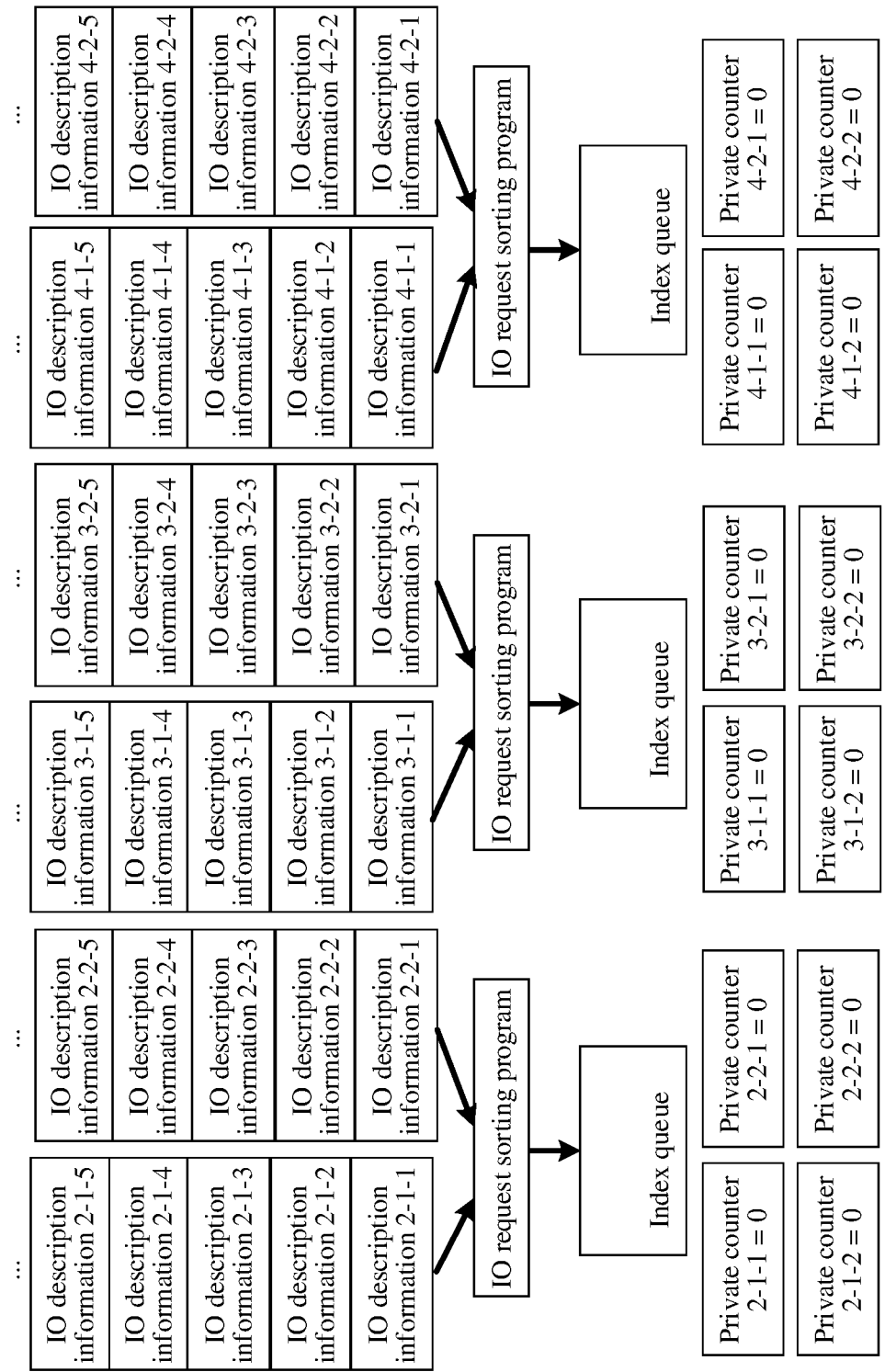
FIGS. 8A, 8B, 8C, 8D, and 8E are schematic diagrams of a process of generating a processing sorting index.

For example, a processor includes three sorting cores. For example, FIG. 8A shows an initial state, and initial values of all private counters are 0. An initial processing sorting index of IO description information that points to the LUN 1 and that of IO description information that points to the LUN 2 are both 0. An IOPS parameter of the LUN 1 is 1000, and an IOPS parameter of the LUN 2 is 500.

Figure 8B:
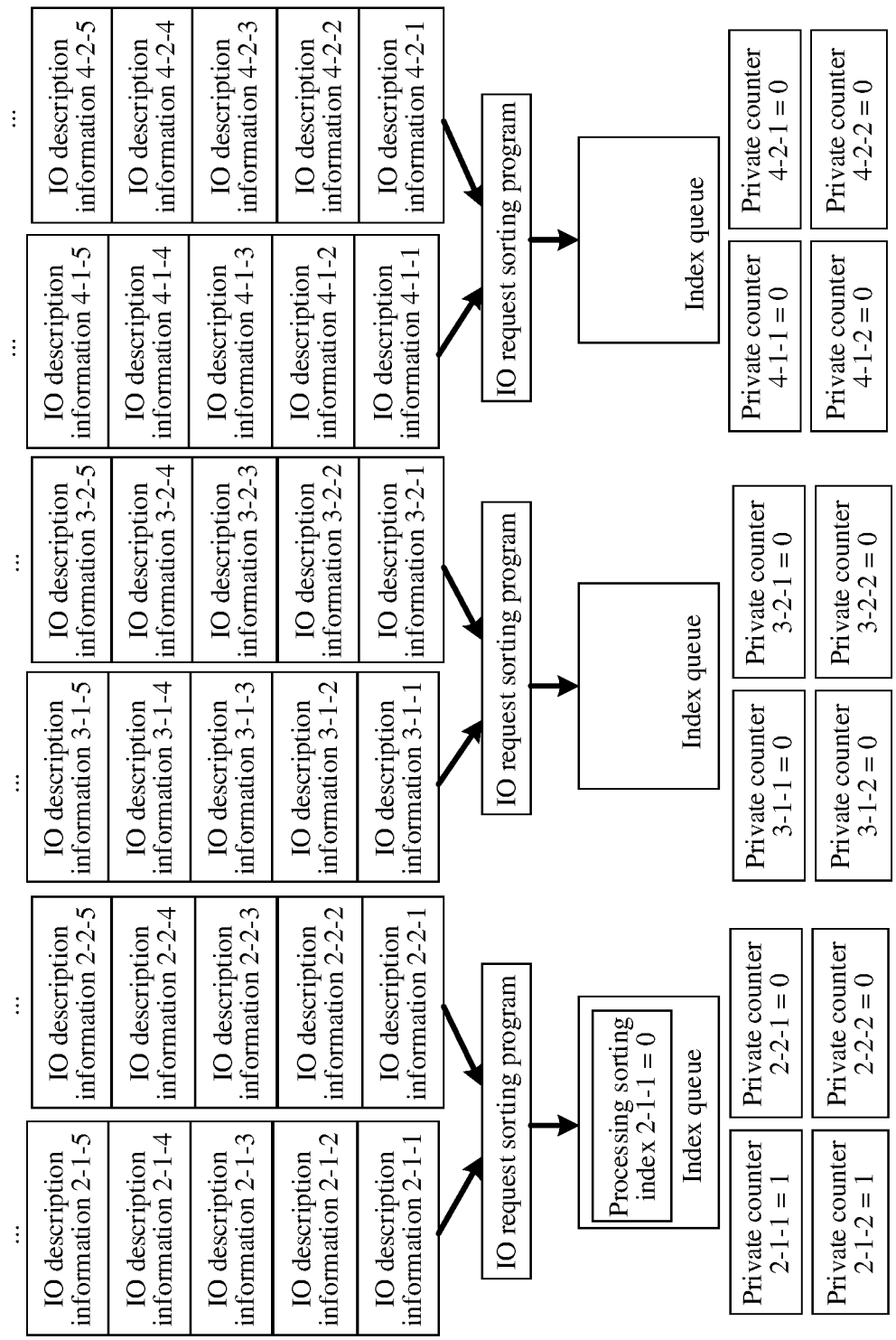

At a moment T1, an IO request sorting program running on a core 2 calculates a processing sorting index for IO description information 2-1-1. Subsequently, the value of the private counter 2-1-1 is increased by 1, and the value of the private counter 2-1-2 is updated, as shown in FIG. 8B.

Figure 8C:
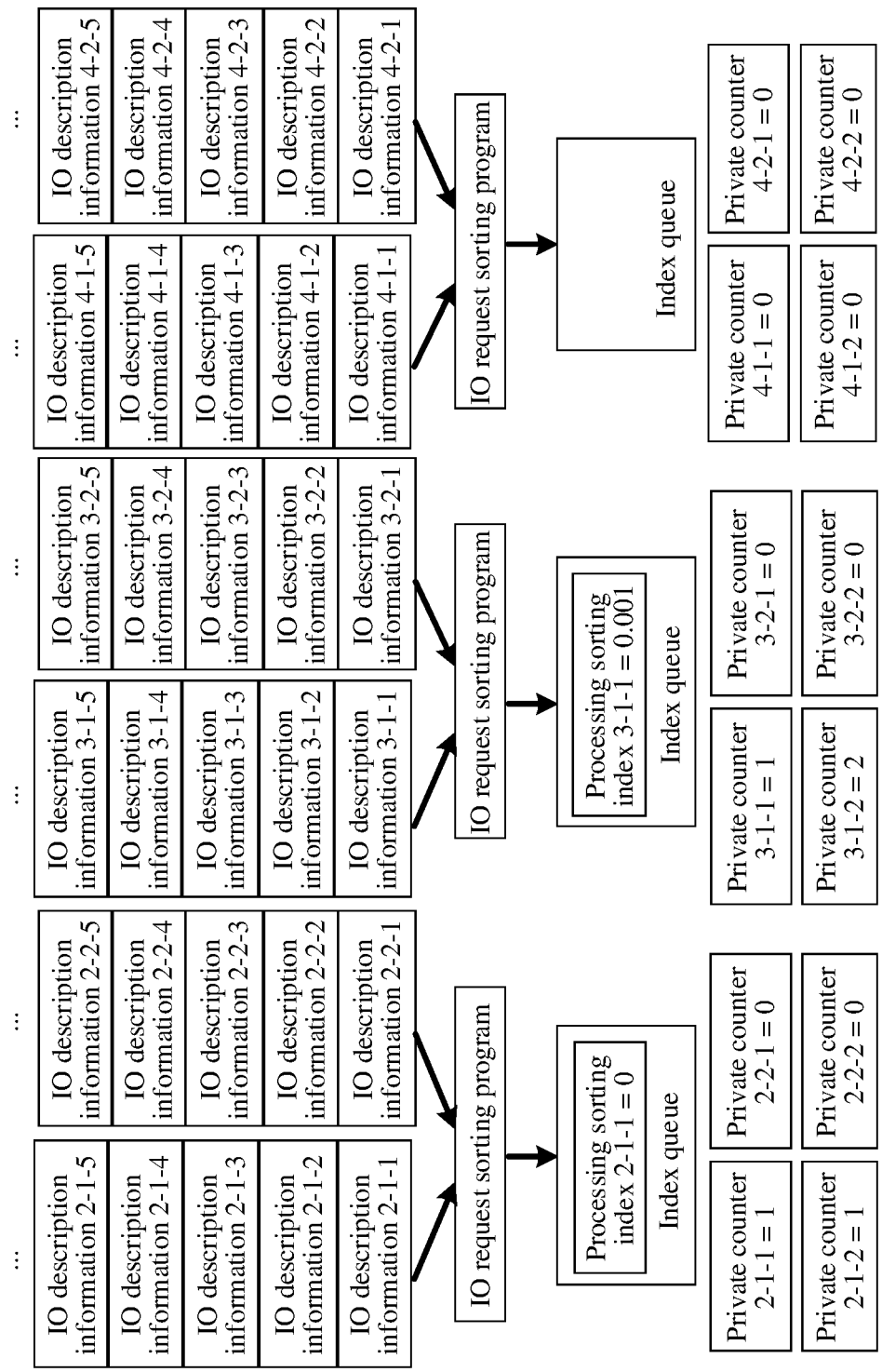

At a moment T2, an IO request sorting program running on a core 3 calculates a processing sorting index for IO description information 3-1-1. Subsequently, a value of a private counter 3-1-1 is increased by 1, and a value of a private counter 3-1-2 is updated, as shown in FIG. 8C.

At a moment T3, an IO request sorting program running on a core 4 calculates a processing sorting index for IO description information 4-1-1. Subsequently, a value of a private counter 4-1-1 is increased by 1, and a value of a private counter 4-1-2 is updated.

Figure 8D:
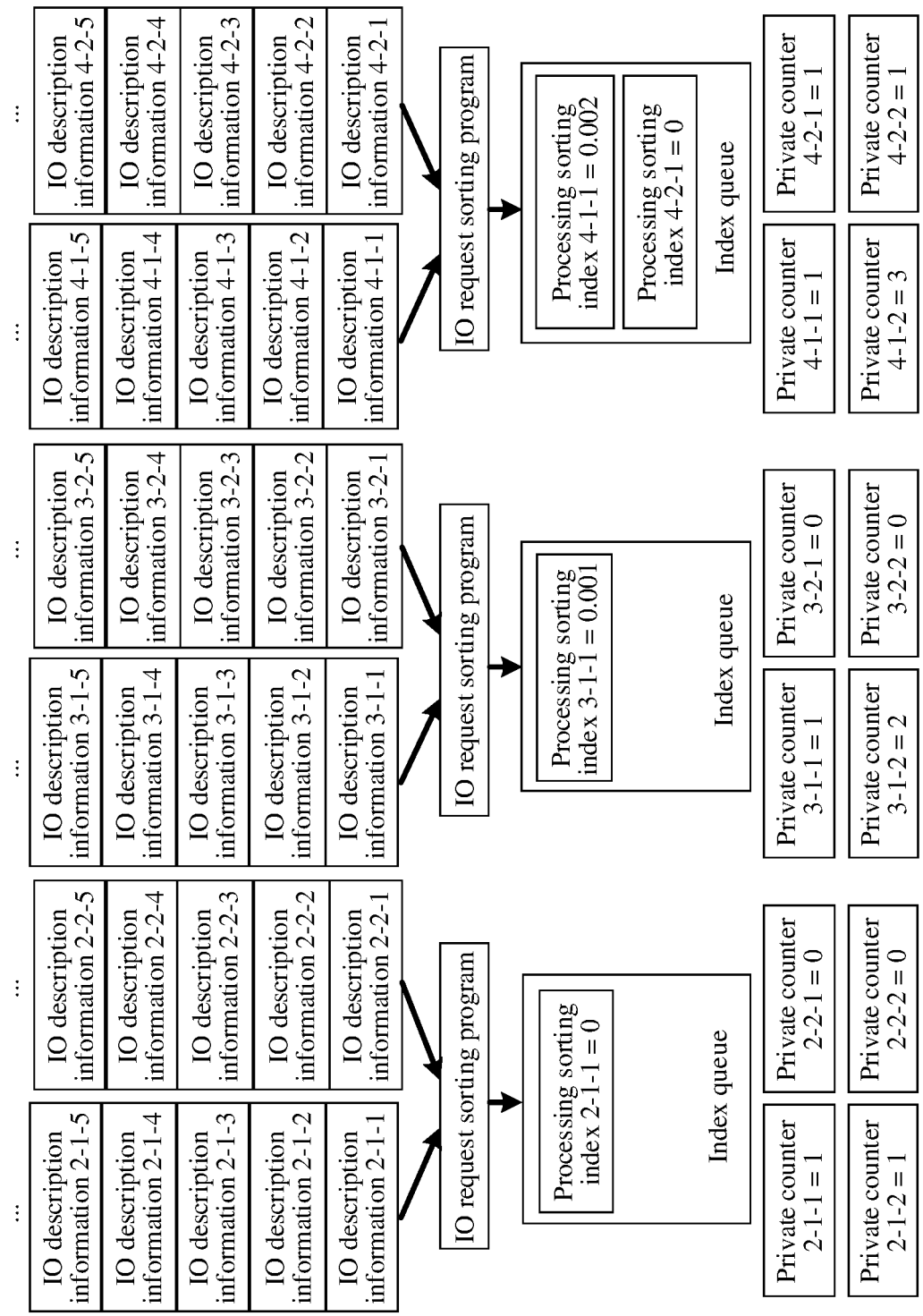

At a moment T4, the IO request sorting program running on the core 4 calculates a processing sorting index for IO description information 4-2-1. Subsequently, a value of a private counter 4-2-1 is increased by 1, and a value of a private counter 4-2-2 is updated, as shown in FIG. 8D.

At a moment T5, the IO request sorting program running on the core 2 calculates a processing sorting index for IO description information 2-1-2. Subsequently, the value of the private counter 2-1-1 is increased by 1, and the value of the private counter 2-1-2 is updated.

Figure 8E:
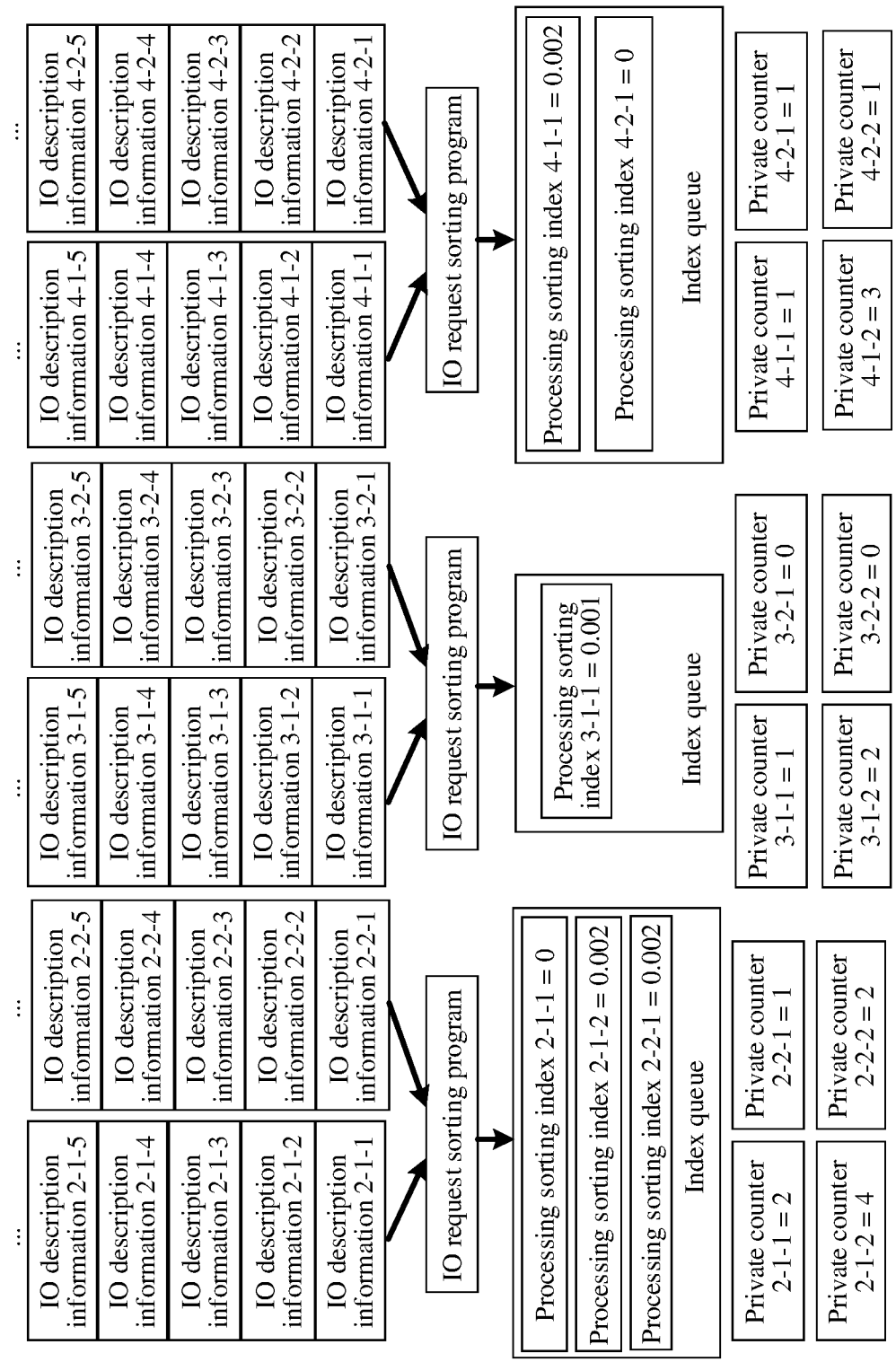

At a moment T6, the IO request sorting program running on the core 2 calculates a processing sorting index for IO description information 2-2-1. Subsequently, a value of a private counter 2-2-1 is increased by 1, and a value of a private counter 2-2-2 is updated, as shown in FIG. 8E.

A process of subsequently generating a processing sorting index for remaining IO description information is deduced by analogy.

In the example corresponding to FIGS. 8A, 8B, 8C, 8D, and 8E, impact of the system time on the process of generating the processing sorting index is not considered.

As shown in FIG. 2A and FIG. 2B, the storage controller applied to this application includes a bus, a processor, a memory device, and a communications interface. The processor, the memory device, and the communications interface communicate using the bus.

The memory device may include a volatile memory, for example, a random access memory (RAM).

The communications interface includes a network interface and a storage medium access interface that are separately configured to obtain an IO request and an access storage medium that are sent by the client.

The memory device stores code required for executing the IO request distribution program, the IO request sorting program, the IO request processing program, and the operating system. When the storage controller runs, each core in the processor invokes the code stored in the memory device, to perform the IO request processing method provided above.

In the foregoing embodiments, the description of each embodiment has respective focuses. For a part that is not described in detail in an embodiment, refer to related descriptions in other embodiments.

The method described in combination with the disclosed content in this application may be implemented in a manner of executing a software instruction by a processor. The software instruction may include a corresponding software module. The software module may be stored in a RAM, a flash memory, a ROM, an erasable programmable read only memory (EPROM), an electrically erasable programmable read only memory (EEPROM), an HDD, an SSD, an optical disc, or a storage medium in any other forms well-known in the art.

A person skilled in the art should be aware that in the foregoing one or more examples, functions described in this application may be implemented by hardware or software. When the present disclosure is implemented by software, the foregoing functions may be stored in a computer-readable medium or transmitted as one or more instructions or code in the computer-readable medium. The storage medium may be any available medium accessible to a general-purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification or improvement made within the spirit and principle of the present disclosure shall fall within the protection scope of this application.

What is claimed is:

1. A storage controller, comprising:
    a memory device; and
    a plurality of processor cores comprising a distribution core, a plurality of sorting cores, and a request processing core,
    wherein the distribution core is configured to:
        receive a plurality of IO requests; and
        distribute each of the IO requests to the plurality of sorting cores to generate a processing sorting index for each of the IO requests,
    wherein each sorting core is configured to:
        obtain one of the IO requests that is distributed by the distribution core;
        determine a target storage unit pointed to by the one of the IO requests;
        obtain an accumulative index quantity of the target storage unit, wherein the accumulative index quantity of the target storage unit indicates a quantity of IO requests that point to the target storage unit and for which the plurality of sorting cores have generated processing sorting indexes since each sorting core generated a processing sorting index for a previously distributed IO request, pointing to the target storage unit; and
        generate, according to the processing sorting index for the previously distributed IO request and a ratio of the accumulative index quantity of the target storage unit to an IO per second parameter of the target storage unit, a processing sorting index for the IO request, and
    wherein the request processing core is configured to process the plurality of IO requests in an order according to processing sorting indexes for the plurality of IO request.

2. A non-transitory computer storage medium, wherein the non-transitory computer storage medium stores a program instruction, wherein the program instruction is stored in a memory device of a storage controller and is called by a plurality of processor cores of the storage controller, wherein the storage controller comprises a distribution core, a plurality of sorting cores, and a request processing core, and wherein the program instruction causes the storage controller to be configured to:
    obtain, by each sorting core, an input/output (IO) request that is distributed by the distribution core and for which a processing sorting index is to be generated;
    determine, by each sorting core, a target storage unit to which the IO request for which the processing sorting index is to be generated points;
    obtain, by each sorting core, an accumulative index quantity of the target storage unit, wherein the accumulative index quantity of the target storage unit indicates a quantity of IO requests that point to the target storage unit and for which the plurality of sorting cores have generated processing sorting indexes since each sorting core generated a processing sorting index for a previously distributed IO request, and wherein the previously distributed IO request points to the target storage unit;
    generate, by each sorting core, according to the processing sorting index of the IO request and a ratio of the accumulative index quantity of the target storage unit to an IO per second parameter of the target storage unit, the processing sorting index for the IO request for which the processing sorting index is to be generated;
    store, by each sorting core into an index queue corresponding to each sorting core, the processing sorting index of the IO request for which the processing sorting index is to be generated, wherein the index queue corresponding to each sorting core is stored in the memory device and comprises processing sorting indexes generated by each sorting core for IO requests that point to a plurality of storage units; and
    periodically process, by the request processing core, another one of the IO requests that corresponds to a minimum processing sorting index in the index queue and one of the sorting cores.

3. A storage controller, comprising:
    a memory device; and
    a plurality of processor cores comprising a distribution core, a plurality of sorting cores, and a request processing core, wherein the distribution core is configured to:
  receive input/output (IO) requests; and
  distribute the IO requests to the plurality of sorting cores to generate a processing sorting index for each IO request,
wherein each sorting core is configured to:
  obtain one of the IO requests that is distributed by the distribution core and for which the processing sorting index is to be generated;
  determine a target storage unit pointed to by the one of the IO requests;
  obtain an accumulative index quantity of the target storage unit, wherein the accumulative index quantity of the target storage unit indicates a quantity of the IO requests that point to the target storage unit and for which the plurality of sorting cores have generated processing sorting indexes since each sorting core generated a processing sorting index for a previously distributed IO request, and wherein the previously distributed IO request points to the target storage unit;
  generate, according to the processing sorting index of the one of the IO requests and a ratio of the accumulative index quantity of the target storage unit to an IO per second parameter of the target storage unit, the processing sorting index for the one of the IO requests; and
  store, into an index queue corresponding to each sorting core, the processing sorting index of the one of the IO requests, wherein the index queue corresponding to each sorting core is stored in the memory device and comprises processing sorting indexes generated by each sorting core for the IO requests that point to a plurality of storage units, and
wherein the request processing core is configured to periodically process another one of the IO requests that corresponds to a minimum processing sorting index in the index queue of one of the sorting cores.

4. The storage controller of claim 3, wherein each sorting core is configured to obtain the accumulative index quantity of the target storage unit by:
  obtaining, from a shared counter for the target storage unit, a current total quantity of IO requests that point to the target storage unit and for which the plurality of sorting cores have generated the processing sorting indexes;
  obtaining, from a private counter of each sorting core that corresponds to the target storage unit, a previous total quantity of IO requests that point to the target storage unit;
  calculating a difference between the current total quantity of IO requests and the previous total quantity of IO requests and using the difference as the accumulative index quantity of the target storage unit;
  increasing a value of the shared counter for the target storage unit by one; and
  updating, using the value of the shared counter for the target storage unit, the private counter of each sorting core that corresponds to the target storage unit.

5. The storage controller of claim 3, wherein each sorting core is configured to obtain the accumulative index quantity of the target storage unit by:
  obtaining a plurality of private quantities from first private counters of the plurality of sorting cores that correspond to the target storage unit, wherein each private quantity of each sorting core indicates a quantity of IO requests that point to the target storage unit;
  summing the plurality of private quantities to obtain a current global quantity of IO requests that point to the target storage unit;
  obtaining, from a second private counter of each sorting core that corresponds to the target storage unit, a previous global quantity of IO requests that point to the target storage unit;
  calculating a difference between the current global quantity of IO requests and the previous global quantity of IO requests to use the difference as the accumulative index quantity of the target storage unit;
  increasing, by one, a value of the first private counter of each sorting core that corresponds to the target storage unit; and
  updating, using a sum of the private quantities of the plurality of sorting cores, the second private counter of each sorting core that corresponds to the target storage unit.

6. The storage controller of claim 3, wherein each sorting core is configured to generate the processing sorting index for the one of the IO requests by:
  obtaining a current system time; and
  using, as the processing sorting index for the one of the IO requests, a larger one of the current system time and a sum of the processing sorting index of the distributed IO request and the ratio of the accumulative index quantity of the target storage unit to the IO per second parameter of the target storage unit.

7. The storage controller of claim 3, wherein each sorting core is further configured to:
  determine, at a moment after the processing sorting index is generated for the one of the IO requests, that no IO request exists that is distributed to each sorting core, that points to the target storage unit, and for which an index is not generated;
  obtain the accumulative index quantity of the target storage unit at the moment after the processing sorting index is generated, wherein the accumulative index quantity of the target storage unit indicates a quantity of the IO requests that point to the target storage unit;
  calculate a sum of the processing sorting index of the one of the IO requests for which the processing sorting index is to be generated and a ratio of the accumulative index quantity of the target storage unit at the moment after the processing sorting index is generated to the IO per second parameter of the target storage unit;
  use the sum as an awaiting processing sorting index; and
  store the awaiting processing sorting index into the index queue corresponding to each sorting core.

8. The storage controller of claim 7, wherein during a period in which the awaiting processing sorting index exists in the index queue, an IO request corresponding to a processing sorting index that is comprised in the index queue that is greater than the awaiting processing sorting index cannot be processed by the request processing core, and wherein each sorting core is further configured to eliminate the awaiting processing sorting index from the index queue corresponding to each sorting core when an IO request that points to the target storage unit is distributed to each sorting core after the processing sorting index is generated or when a time in which the awaiting processing sorting index exists exceeds a preset threshold.

9. The storage controller of claim 3, wherein the request processing core is configured to:
  periodically process the IO request corresponding to the minimum processing sorting index in the index queue corresponding to each sorting core;

periodically access the index queue corresponding to each sorting core; and process, in each access, the IO request corresponding to the minimum processing sorting index in the index queue corresponding to each sorting core.

10. The storage controller of claim 3, wherein the target storage unit comprises a logical unit number.

11. The storage controller of claim 3, wherein the target storage unit comprises a file system.

12. The storage controller of claim 3, wherein the target storage unit comprises a bucket.

13. An input/output (IO) request processing method, implemented by a storage controller comprising a memory device, a distribution core, a plurality of sorting cores, and a request processing core, wherein the IO request processing method comprises:

receiving, by the distribution core, IO requests;

distributing, by the distribution core, the IO requests to the plurality of sorting cores;

obtaining, by each sorting core, one of the IO requests that is distributed by the distribution core and for which a processing sorting index is to be generated;

determining, by each sorting core, a target storage unit to which the one of the IO requests for which the processing sorting index is to be generated points;

obtaining, by each sorting core, an accumulative index quantity of the target storage unit, wherein the accumulative index quantity of the target storage unit indicates a quantity of IO requests that point to the target storage unit and for which the plurality of sorting cores have generated processing sorting indexes since each sorting core generated a processing sorting index for a previously distributed IO request, and wherein the previously distributed IO request points to the target storage unit;

generating, by each sorting core according to the processing sorting index of the distributed IO request and a ratio of the accumulative index quantity of the target storage unit to an IO per second parameter of the target storage unit, the processing sorting index for the one of the IO requests for which the processing sorting index is to be generated;

storing, by each sorting core into an index queue corresponding to each sorting core, the processing sorting index of the one of the IO requests for which the processing sorting index is to be generated, wherein the index queue corresponding to each sorting core is stored in the memory device and comprises processing sorting indexes generated by each sorting core for IO requests that point to a plurality of storage units; and periodically processing, by the request processing core, another one of the IO requests corresponding to a minimum processing sorting index in the index queue of one of the sorting cores.

14. The IO request processing method of claim 13, wherein obtaining, by each sorting core, the accumulative index quantity of the target storage unit comprises:

obtaining, by each sorting core from a shared counter for the target storage unit, a current total quantity of IO requests that point to the target storage unit and for which the plurality of sorting cores have generated processing sorting indexes;

obtaining, by each sorting core from a private counter of each sorting core that corresponds to the target storage unit, a previous total quantity of IO requests that point to the target storage unit and for which the plurality of sorting cores have generated processing sorting indexes;

calculating, by each sorting core, a difference between the current total quantity of IO requests and the previous total quantity of IO requests, to use the difference as the accumulative index quantity of the target storage unit;

increasing, by each sorting core, a value of the shared counter for the target storage unit by one; and updating, by each sorting core using the value of the shared counter for the target storage unit, the private counter of each sorting core that corresponds to the target storage unit.

15. The IO processing method of claim 13, wherein obtaining, by each sorting core, the accumulative index quantity of the target storage unit comprises:

obtaining, by each sorting core, a plurality of private quantities from first private counters of the plurality of sorting cores that correspond to the target storage unit, wherein the private quantity of each sorting core indicates a quantity of IO requests that point to the target storage unit and for which each sorting core has generated processing sorting indexes;

summing, by each sorting core, the plurality of private quantities to obtain a current global quantity of IO requests that point to the target storage unit and for which processing sorting indexes have been generated;

obtaining, by each sorting core from a second private counter of each sorting core that corresponds to the target storage unit, a previous global quantity of IO requests that point to the target storage unit and for which the plurality of sorting cores have generated processing sorting indexes when the plurality of sorting cores generate processing sorting indexes for the distributed IO request;

calculating, by each sorting core, a difference between the current global quantity of IO requests and the previous global quantity of IO requests, to use the difference as the accumulative index quantity of the target storage unit;

increasing, by each sorting core by one, a value of the first private counter of each sorting core that corresponds to the target storage unit; and updating, by each sorting core using a sum of current private quantities of the plurality of sorting cores, the second private counter of each sorting core that corresponds to the target storage unit.

16. The IO processing method of claim 13, wherein generating, by each sorting core, the processing sorting index for the IO request for which the processing sorting index is to be generated comprises:

obtaining, by each sorting core, a current system time; and using, by each sorting core as the processing sorting index of the IO request for which the processing sorting index is to be generated, a larger one of the current system time and a sum of the processing sorting index of the distributed IO request and the ratio of the accumulative index quantity of the target storage unit to the IO per second parameter of the target storage unit.

17. The IO processing method of claim 13, further comprising:

determining, by each sorting core at a moment after the processing sorting index is generated for the IO request for which the processing sorting index is to be generated, that no IO request exists that is distributed to each sorting core, that points to the target storage unit, and for which an index is not generated;

obtaining, by each sorting core, the accumulative index quantity of the target storage unit at the moment after the processing sorting index is generated, wherein the accumulative index quantity of the target storage unit indicates a quantity of IO requests that point to the target storage unit and for which the plurality of sorting cores have generated processing sorting indexes;

calculating, by each sorting core, a sum of the processing sorting index of the IO request for which the processing sorting index is to be generated and a ratio of the accumulative index quantity of the target storage unit at the moment to the IO per second parameter of the target storage unit, to use the sum as an awaiting processing sorting index; and storing, by each sorting core, the awaiting processing sorting index into the index queue corresponding to each sorting core.

18. The IO processing method of claim 17, wherein during a period in which the awaiting processing sorting index exists in the index queue corresponding to each sorting core, an IO request corresponding to a processing sorting index that is comprised in the index queue corresponding to each sorting core and that is greater than the awaiting processing sorting index cannot be processed by the request processing core, and wherein the method further comprises eliminating, by each sorting core, the awaiting processing sorting index from the index queue corresponding to each sorting core when an IO request that points to the target storage unit is distributed to each sorting core after the moment the processing sorting index is generated or when a time in which the awaiting processing sorting index exists exceeds a preset threshold.

19. The IO processing method of claim 13, wherein periodically processing, by the request processing core, the IO request corresponding to the minimum processing sorting index in the index queue corresponding to each sorting core comprises:

periodically accessing, by the request processing core, the index queue corresponding to each sorting core; and processing, by the request processing core in each access, the IO request corresponding to the minimum processing sorting index in the index queue corresponding to each sorting core.

20. The IO request processing method of claim 13, wherein the target storage unit comprises a logical unit number, a file system, or a bucket.

* * * * *